(12) United States Patent
Papasakellariou

(10) Patent No.: US 11,716,740 B2
(45) Date of Patent: Aug. 1, 2023

(54) TRANSMISSIONS OF DOWNLINK CONTROL CHANNELS FOR LOW COST UES

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/302,393

(22) Filed: Apr. 30, 2021

(65) Prior Publication Data

US 2021/0258937 A1 Aug. 19, 2021

Related U.S. Application Data

(62) Division of application No. 15/064,529, filed on Mar. 8, 2016, now abandoned.
(Continued)

(51) Int. Cl.
*H04W 72/04* (2023.01)
*H04L 5/00* (2006.01)
*H04W 72/12* (2023.01)
*H04L 1/18* (2023.01)
*H04L 1/08* (2006.01)
(Continued)

(52) U.S. Cl.
CPC .............. *H04W 72/23* (2023.01); *H04L 1/08* (2013.01); *H04L 1/1671* (2013.01); *H04L 1/18* (2013.01); *H04L 1/1887* (2013.01); *H04L 1/1896* (2013.01); *H04L 5/005* (2013.01); *H04L 5/0053* (2013.01); *H04L 1/1822* (2013.01);
(Continued)

(58) Field of Classification Search
CPC . H04L 1/08; H04L 1/1671; H04L 1/18; H04L 1/1822; H04L 1/1887; H04L 1/1896; H04L 5/005; H04L 5/0051; H04L 5/0053; H04L 5/0057; H04W 72/042; H04W 72/1289; H04W 74/008
See application file for complete search history.

(56) References Cited

U.S. PATENT DOCUMENTS 10,104,684 B2 10/2018 Seo et al.
2011/0134857 A1 6/2011 Seo et al.
(Continued)

FOREIGN PATENT DOCUMENTS

CN 101848540 A 9/2010
CN 102118864 A 7/2011
(Continued)

OTHER PUBLICATIONS

Notification of the Third Office Action dated Apr. 30, 2021, in connection with Chinese Patent Application No. 201680008770.8, 36 pages.
(Continued)

*Primary Examiner* — Derrick V Rose

(57) ABSTRACT

Methods and apparatus are provided to support transmissions of control channels with coverage enhancements (CE) to low cost (LC) user equipments (LC/CE UEs) in a narrowband of a system bandwidth. A narrowband for a control channel transmission can depend on a type of information being scheduled for transmission by the control channel.

20 Claims, 9 Drawing Sheets

Related U.S. Application Data

(60) Provisional application No. 62/248,572, filed on Oct. 30, 2015, provisional application No. 62/131,640, filed on Mar. 11, 2015.

(51) Int. Cl.
| | | |
|---|---|---|
| *H04L 1/16* | (2023.01) | |
| *H04W 72/23* | (2023.01) | |
| *H04L 1/1867* | (2023.01) | |
| *H04L 1/1607* | (2023.01) | |
| H04W 74/00 | (2009.01) | |
| H04L 1/1822 | (2023.01) | |

(52) U.S. Cl.
CPC .......... *H04L 5/0051* (2013.01); *H04L 5/0057* (2013.01); *H04W 74/008* (2013.01)

(56) References Cited

U.S. PATENT DOCUMENTS

| | | | |
|---|---|---|---|
| 2012/0182931 | A1 | 7/2012 | Shen et al. |
| 2013/0039291 | A1 | 2/2013 | Blankenship et al. |
| 2013/0083749 | A1 | 4/2013 | Xu et al. |
| 2014/0050165 | A1 | 2/2014 | Park |
| 2014/0050195 | A1 | 2/2014 | Kotecha |
| 2014/0092830 | A1 | 4/2014 | Chen et al. |
| 2014/0133433 | A1 | 5/2014 | Ahn et al. |
| 2014/0328302 | A1* | 11/2014 | Park ................ H04W 72/08 370/329 |
| 2014/0341141 | A1 | 11/2014 | Nguyen et al. |
| 2014/0355559 | A1* | 12/2014 | Gao ................ H04L 5/0053 370/330 |
| 2015/0036615 | A1* | 2/2015 | Shimezawa ........... H04L 5/0051 370/329 |
| 2016/0227541 | A1 | 8/2016 | Damnjanovic et al. |
| 2016/0353440 | A1 | 12/2016 | Lee et al. |

FOREIGN PATENT DOCUMENTS

| | | | |
|---|---|---|---|
| CN | 103220107 | A | 7/2013 |
| CN | 103684683 | A | 3/2014 |
| CN | 104025485 | A | 9/2014 |
| CN | 104871589 | A | 8/2015 |
| EP | 2605603 | A1 | 6/2013 |
| KR | 10-2013-0108192 | A | 10/2013 |
| WO | 2013166104 | A2 | 11/2013 |
| WO | 2013174695 | A1 | 11/2013 |
| WO | 2014019436 | A1 | 2/2014 |

OTHER PUBLICATIONS

Communication pursuant to Article 94(3) EPC dated Apr. 5, 2022 in connection with European Patent Application No. 16 762 027.7, 7 pages.
3GPP TS 36.211 V12.4.0 (Dec. 2014) 3rd Generation Partnership Project; Technical Specification Group Radio Access Network; E-UTRA; Physical channels and modulation; (Release 12), 124 pgs.
3GPP TS 36.212 V12.3.0 (Dec. 2014) 3rd Generation Partnership Project; Technical Specification Group Radio Access Network; E-UTRA; Multiplexing and channel coding (Release 12), 89 pgs.
3GPP TS 36.213 V12.4.0 (Dec. 2014) 3rd Generation Partnership Project; Technical Specification Group Radio Access Network; E-UTRA, Physical layer procedures (Release 12), 225 pgs.
3GPP TS 36.321 V12.4.0 (Dec. 2014) 3rd Generation Partnership Project; Technical Specification Group Radio Access Network; E-UTRA; Medium Access Control (MAC) protocol specification (Release 12), 60 pgs.
3GPP TS 36.331 V12.4.0 (Dec. 2014) 3rd Generation Partnership Project; Technical Specification Group Radio Access Network; E-UTRA; Radio Resource Control (RRC); Protocol specification (Release 12), 410 pgs.
International Search Report dated Jun. 29, 2016 in connection with International Application No. PCT/KR2016/002475; 3pages.
Written Opinion of the International Searching Authority dated Jun. 29, 2016 in connection with International Application No. PCT/KR2016/002475; 7 pages.
LG Electronics, "EPDCCH and PDSCH Related Issues for MTC", 3GPP TSG RAN WG1 Meeting #79, R1-144893, San Francisco, California, Nov. 17-21, 2014, 5 pages.
Sony, "MTC Operation with a Narrowband PDCCH", 3GPP TSG-RAN WG1 Meeting #80, R1-150428, Athens, Greece, Feb. 9-13, 2015, 16 pages.
Foreign Communication from Related Counterpart Application; European Patent Application No. 16762027.7; Extended European Search Report and European Search Opinion dated Feb. 27, 2018; 9 pages.
Office Action dated Feb. 3, 2020 in connection with Chinese Patent Application No. 201680008770.8, 16 pages.
Communication pursuant to Article 94(3) EPC dated Nov. 14, 2019 in connection with European Patent Application No. 16 762 027.7, 5 pages.
Communication pursuant to Article 94(3) EPC in connection with European Application No. 16762027.7 dated Oct. 29, 2020.
National Intellectual Property Administration, PRC, "Notification of Granting of Patent Right to Invention & Notification of Due Registration Formalities", dated Sep. 28, 2021, in connection with Chinese Patent Application No. CN201680008770.8, 9 pages.
Li et al., "Implementation of DCI Format Detection and Transmission Scheme Confirmation of PDSCH in LTE System", Television Technology, 2013, Issue 17, LTE system DCI format detection and PDSCH transmission scheme realization, 7 pages.
Intellectual Property India, Examination report under sections 12 & 13 of the Patents Act, dated Jan. 28, 2021, regarding Application No. 201737024941, 5 pages.
Huawei, et al., "Supporting FDM for MTC UEs and other UEs", 3GPP TSG RAN WG1 Meeting #80, R1-150400, Feb. 2015, 4 pages.
Nokia Networks, et al., "Physical Downlink Control Channel for MTC", 3GPP TSG-RAN WG1 Meeting #80, R1-150257, Feb. 2015, 4 pages.
Korean Intellectual Property Office, Notice of Preliminary Rejection dated Apr. 7, 2023 regarding Application No. 10-2017-7017673, 11 pages.
Lenovo, "DL physical control channels for MTC", 3GPP TSG RAN WG1 Meeting #80, R1-150550, Feb. 2015, 5 pages.

* cited by examiner

TRANSMISSIONS OF DOWNLINK CONTROL CHANNELS FOR LOW COST UES

CROSS-REFERENCE TO RELATED APPLICATION AND CLAIM OF PRIORITY

This application is a divisional of U.S. patent application Ser. No. 15/064,529, filed Mar. 8, 2016, which claims priority under 35 U.S.C. § 119(e) to U.S. Provisional Patent Application No. 62/131,640, filed Mar. 11, 2015, and U.S. Provisional Patent Application No. 62/248,572, filed Oct. 30, 2015. The contents of the above-identified patent documents are incorporated herein by reference.

TECHNICAL FIELD

The present application relates generally to wireless communications and, more specifically, to transmitting control channels to user equipments (UEs) and to scheduling transmissions to or from UEs.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

This disclosure provides methods and apparatus for transmitting control channels to UEs and for scheduling transmissions to or from UEs.

In a first embodiment, a base station is provided. The base station includes a transmitter. The transmitter is configured to transmit, in a first subframe and within a first narrowband that includes six consecutive resource blocks (RBs) in a downlink (DL) system bandwidth, a physical DL control channel (PDCCH). Each RB includes a number of resource elements (REs) indexed in ascending order in a frequency domain and the six consecutive RBs in the first narrowband are indexed in ascending order according to the indexes of respective REs. When the PDCCH is transmitted over a set of two RBs, the PDCCH is mapped to a first number of control channel elements (CCEs), each CCE from the first number of CCEs includes resource elements groups (REGs) from a first RB and from a second RB, and each REG includes a number of REs either from the first RB or from the second RB. When the PDCCH is transmitted over a set of four RBs, the PDCCH is mapped to a second number of CCEs, each CCE from the second number of CCEs includes REGs from a third RB, a fourth RB, a fifth RB, and a sixth RB, and each REG includes a number of REs either from the third RB, or from the fourth RB, or from the fifth RB, or from the sixth RB. When the PDCCH is transmitted over the six consecutive RBs, the PDCCH is mapped over REs first across the six consecutive RBs, starting from the RE with the lowest index, and then across symbols of the first subframe.

In a second embodiment, a UE is provided. The user equipment includes a receiver. The receiver is configured to receive, in a first subframe and within a first narrowband that includes six consecutive resource blocks (RBs) in a downlink (DL) system bandwidth, a physical DL control channel (PDCCH). Each RB includes a number of resource elements (REs) indexed in ascending order in a frequency domain and the six consecutive RBs in the first narrowband are indexed in ascending order according to the indexes of respective REs. When the PDCCH is received over a set of two RBs, the PDCCH is mapped to a first number of control channel elements (CCEs), each CCE from the first number of CCEs includes resource elements groups (REGs) from a first RB and from a second RB, and each REG includes a number of REs either from the first RB or from the second RB. When the PDCCH is received over a set of four RBs, the PDCCH is mapped to a second number of CCEs, each CCE from the second number of CCEs includes REGs from a third RB, a fourth RB, a fifth RB, and a sixth RB, and each REG includes a number of REs either from the third RB, or from the fourth RB, or from the fifth RB, or from the sixth RB. When the PDCCH is received over the six consecutive RBs, the PDCCH is mapped over REs first across the six consecutive RBs, starting from the RE with the lowest index, and then across symbols of the first subframe.

In a third embodiment, a base station is provided. The base station includes a transmitter and a receiver. The transmitter is configured to transmit within one or more first narrowbands of six RBs a PDCCH scheduling a transmission of a PDSCH conveying one or more random access response (RAR) messages, wherein each RAR message is associated with a random access preamble transmission and includes scheduling information for a transmission of a physical uplink shared channel (PUSCH) in a number of transmission time intervals (TTIs), and wherein the scheduling information includes 20 binary elements when the PDSCH transmission and the PUSCH transmission are according to a first CE mode and includes 12 binary elements when the PDSCH transmission and the PUSCH transmission are according to a second CE mode. The receiver is configured to receive the PUSCH according to the scheduling information.

In a fourth embodiment, a UE is provided. The user equipment includes a receiver and a transmitter. The receiver is configured to receive within one or more first narrowbands of six RBs a PDCCH scheduling a transmission of a PDSCH conveying one or more RAR messages, wherein each RAR message is associated with a random access preamble transmission and includes scheduling information for a transmission of a PUSCH in a number of TTIs, and wherein the scheduling information includes 20 binary elements when the PDSCH transmission and the PUSCH transmission are according to a first CE mode and includes 12 binary elements when the PDSCH transmission and the PUSCH transmission are according to a second CE mode. The transmitter is configured to transmit the PUSCH according to the scheduling information.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive,"

and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many when not most instances such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

The following documents and standards descriptions are hereby incorporated by reference into the present disclosure as when fully set forth herein: 3GPP TS 36.211 v12.4.0, "E-UTRA, Physical channels and modulation" (REF 1); 3GPP TS 36.212 v12.3.0, "E-UTRA, Multiplexing and Channel coding" (REF 2); 3GPP TS 36.213 v12.4.0, "E-UTRA, Physical Layer Procedures" (REF 3); 3GPP TS 36.321 v12.4.0, "E-UTRA, Medium Access Control (MAC) protocol specification" (REF 4); and 3GPP TS 36.331 v12.4.0, "E-UTRA, Radio Resource Control (RRC) Protocol Specification" (REF 5).

This disclosure relates to transmitting control channels to UEs and to scheduling transmissions to or from UEs. A wireless communication network includes a DL that conveys signals from transmission points, such as base stations or enhanced NodeBs (eNBs), to UEs. The wireless communication network also includes an uplink (UL) that conveys signals from UEs to reception points, such as eNBs.

Figure 1:
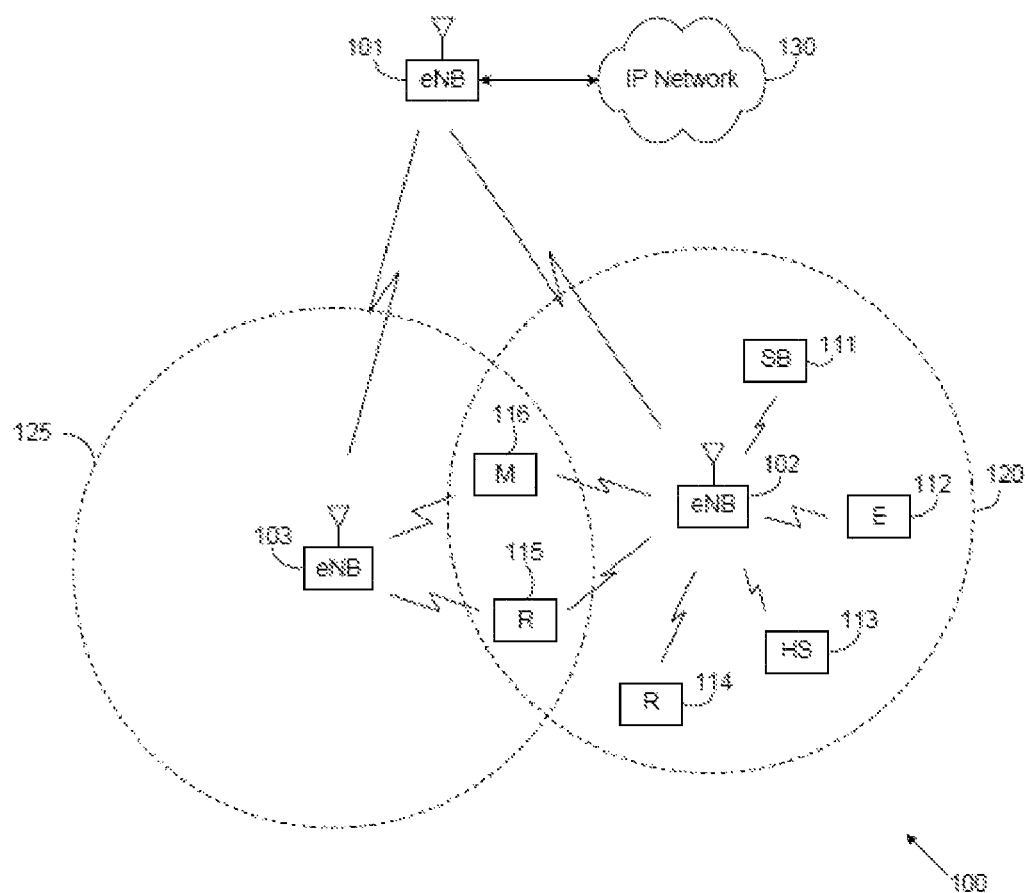
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms can be used instead of "NodeB" or "eNB," such as "base station" or "access point." For the sake of convenience, the terms "NodeB" and "eNB" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." A UE can be fixed or mobile and can be a cellular phone, a personal computer device, and the like. For the sake of convenience, the terms "user equipment" and "UE" are used in this patent document to refer to remote wireless equipment that wirelessly accesses an eNB, whether the UE is a mobile device (such as a mobile telephone or smart-phone) or is normally considered a stationary device (such as a desktop computer or vending machine).

The eNB 102 provides wireless broadband access to the network 130 for a first plurality of UEs within a coverage area 120 of the eNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, can have other shapes, including irregular shapes, depending upon the configuration of the eNBs and variations in the radio environment associated with natural and man-made obstructions.

As described in more detail below, various components of the network 100, such as the eNBs 101-103, support the adaptation of communication direction in the network 100, and can transmit control channels and schedule transmissions in order to communicate with one or more of UEs 111-116. In addition, one or more of UEs 111-116 are configured to support the adaptation of communication direction in the network 100, and to receive transmissions of control channels and scheduling of transmissions from one or more of eNBs 101-103.

Although FIG. 1 illustrates one example of a wireless network 100, various changes can be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
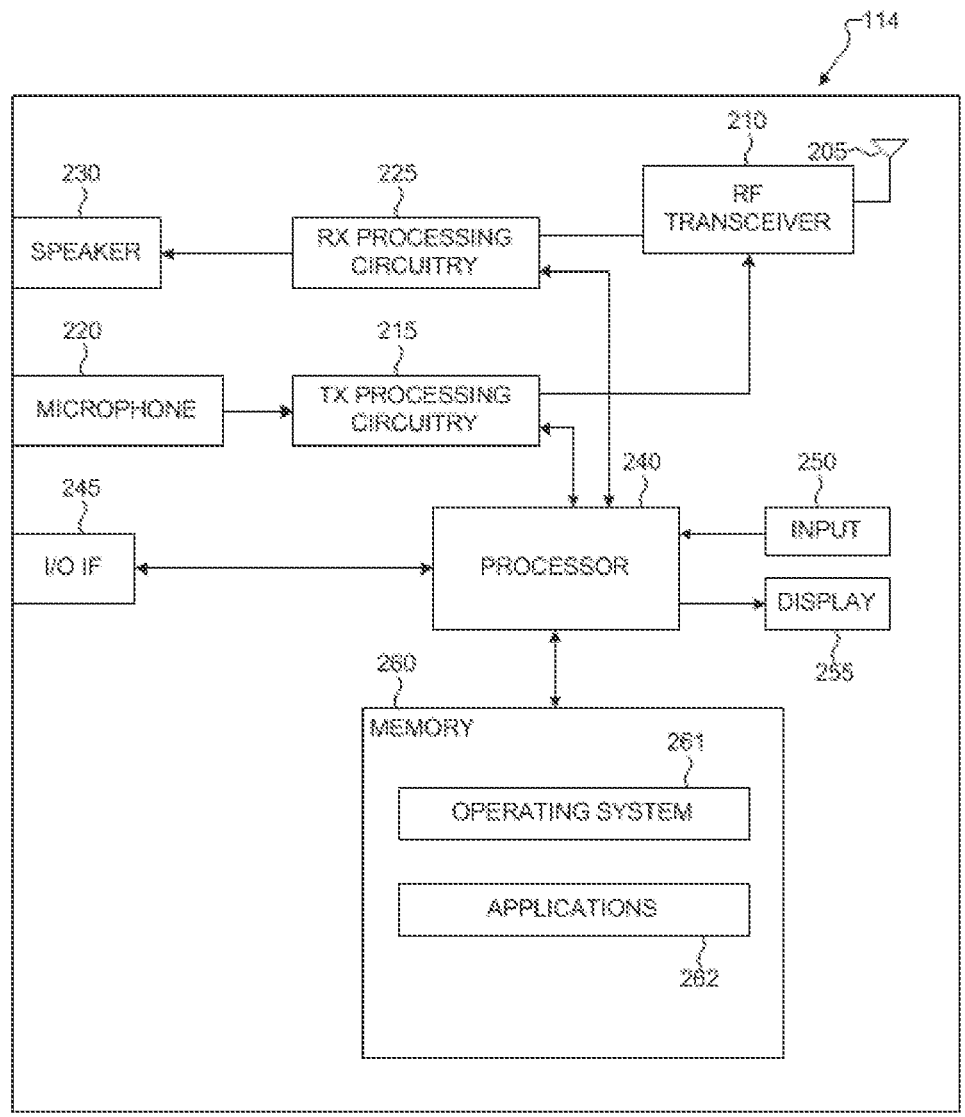
FIG. 2 illustrates an example UE according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a processor 240, an input/output (I/O) interface (IF) 245, an input 250, a display 255, and a memory 260. The memory 260 includes an operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The WHEN or baseband signal is sent to the RX processing circuitry 225, which generates a processed baseband signal by filtering, decoding, and/or digitizing the baseband or WHEN signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or WHEN signal. The RF transceiver 210 receives the outgoing processed baseband or WHEN signal from the TX processing circuitry 215 and up-converts the baseband or WHEN signal to an RF signal that is transmitted via the antenna 205.

The processor 240 can include one or more processors or other processing devices and can execute the OS program 261 stored in the memory 260 in order to control the overall operation of the UE 114. For example, the processor 240 could control the reception of forward channel signals and the transmission of reverse channel signals by the RF transceiver 210, the RX processing circuitry 225, and the TX processing circuitry 215 in accordance with well-known principles. In some embodiments, the processor 240 includes at least one microprocessor or microcontroller.

The processor 240 is also capable of executing other processes and programs resident in the memory 260. The processor 240 can move data into or out of the memory 260 as required by an executing process. In some embodiments, the processor 240 is configured to execute the applications 262 based on the OS program 261 or in response to signals received from eNBs, other UEs, or an operator. The processor 240 is also coupled to the I/O interface 245, which provides the UE 114 with the ability to connect to other devices such as laptop computers and handheld computers. The I/O interface 245 is the communication path between these accessories and the processor 240.

The processor 240 is also coupled to the input 250 (e.g., touchscreen, keypad, etc.) and the display 255. The operator of the UE 114 can use the input 250 to enter data into the UE 114. The display 255 can be a liquid crystal display or other display capable of rendering text and/or at least limited graphics, such as from web sites. The display 255 could also represent a touch-screen.

The memory 260 is coupled to the processor 240. Part of the memory 260 could include a broadcast signaling memory (RAM), and another part of the memory 260 could include a Flash memory or other read-only memory (ROM).

As described in more detail below, the transmit and receive paths of the UE 114 support receiving transmissions of control channels and of data channels in normal coverage (no repetitions) or in enhanced coverage. In certain embodiments, the TX processing circuitry 215 and RX processing circuitry 225 include processing circuitry configured to receive transmission of control channels and of data channels in a normal coverage or in an enhanced coverage. In certain embodiments, the processor 240 is configured to control the RF transceivers 210, the TX processing circuitry 215, or the RX processing circuitry 225, or a combination thereof, to determine to receive control channels and scheduling for transmissions.

Although FIG. 2 illustrates one example of UE 114, various changes can be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). Also, while FIG. 2 illustrates the UE 114 configured as a mobile telephone or smart-phone, UEs could be configured to operate as other types of mobile or stationary devices. In addition, various components in FIG. 2 could be replicated, such as when different RF components are used to communicate with the eNBs 101-103 and with other UEs.

Figure 3:
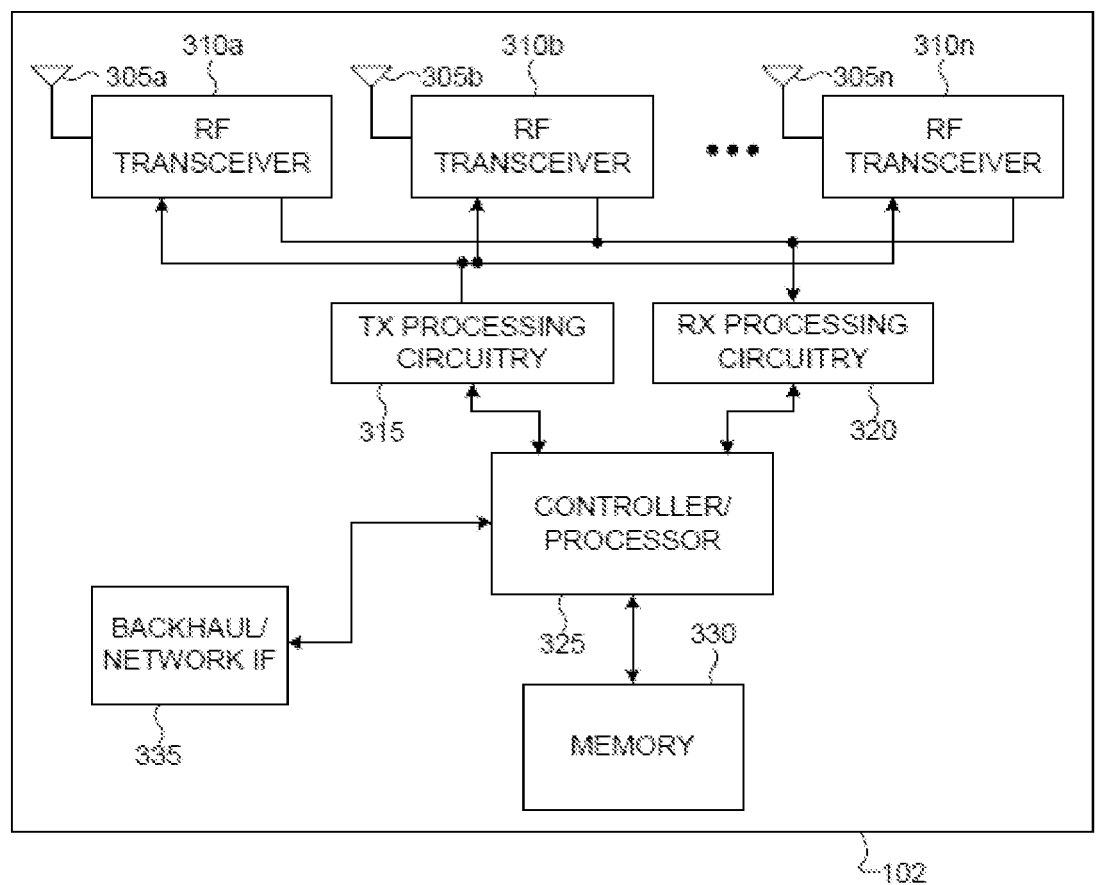
FIG. 3 illustrates an example enhanced NodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate WHEN or baseband signals. The WHEN or baseband signals are sent to the RX processing circuitry 320, which generates processed baseband signals by filtering, decoding, and/or digitizing the baseband or WHEN signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or WHEN signals. The RF transceivers 310a-310n receive the outgoing processed baseband or WHEN signals from the TX processing circuitry 315 and up-converts the baseband or WHEN signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 support transmissions of control channels and of data channels to UEs and receptions of control channels and of data channels from UEs in normal coverage or in enhanced coverage. In certain embodiments, the TX processing circuitry 315 and RX processing circuitry 320 include processing circuitry configured to support transmissions of control channels and of data channels to UEs and receptions of control channels and of data channels from UEs in normal coverage or in enhanced coverage. In certain embodiments, the processor 240 is configured to control the RF transceivers 310a-310n, TX processing circuitry 315 or RX processing circuitry 320, or a combination thereof, to support transmissions of control channels and data channels to UEs and receptions of control channels and of data channels from UEs in a normal coverage or in enhanced coverage.

Although FIG. 3 illustrates one example of an eNB 102, various changes can be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

A TTI for DL signaling or UL signaling is referred to as a subframe (SF) and includes two slots. A unit of ten SFs is referred to as a frame. A frame is identified by a System Frame Number (SFN) ranging from 0 to 1023 (and can be represented by 10 binary elements or bits). A bandwidth (BW) unit for DL signaling or UL signaling is referred to as a resource RB, one RB over one slot is referred to as a physical RB (PRB), and one RB over one SF is referred to as a PRB pair. Each RB consists of $N_{sc}^{RB}$ sub-carriers, or resource elements (REs). A RE is identified by the pair of indexes (k,l) where k is a frequency domain index and l in a time domain index.

In some wireless networks, DL signals include data signals conveying information content, control signals conveying DL control information (DCI), and reference signals (RS) that are also known as pilot signals. DL signals can be transmitted using orthogonal frequency division multiplexing (OFDM). The eNB 102 can transmit data information through PDSCHs and can transmit DCI through PDCCHs or through enhanced PDCCHs (EPDCCHs)—see also REF 1. For brevity, subsequent descriptions consider the EPDCCH. An EPDCCH consists of enhanced resource element groups (EREGs)—see also REF 1. The eNB 102 can also transmit acknowledgement information, in response to reception of data transport blocks, in a physical hybrid-ARQ indicator channel (PHICH) that is transmitted over REs in a DL system BW (see also REF 1).

The eNB 102 can transmit one or more of multiple types of RS, including a UE-common RS (CRS), a channel state information RS (CSI-RS), and a demodulation RS (DMRS)—see also REF 1. A CRS can be transmitted over a DL system BW and can be used by UEs to demodulate data or control signals or to perform measurements. To reduce CRS overhead, eNB 102 can transmit a CSI-RS with a smaller density in the time or frequency domain than a CRS. A UE can determine CSI-RS transmission parameters through higher-layer signaling, such as radio resource control (RRC) signaling (see also REF 5) from eNB 102. DMRS is transmitted only in the BW of a respective PDSCH or EPDCCH, and a UE can use the DMRS to demodulate information in the PDSCH or EPDCCH. A transmission time unit for a PDSCH or for an EPDCCH is referred is one SF. For brevity, remaining descriptions in this disclosure assume that an OFDM symbol has a normal cyclic prefix (CP) but the embodiments are also directly applicable to when an OFDM symbol has an extended CP (see also REF 1).

Figure 4:
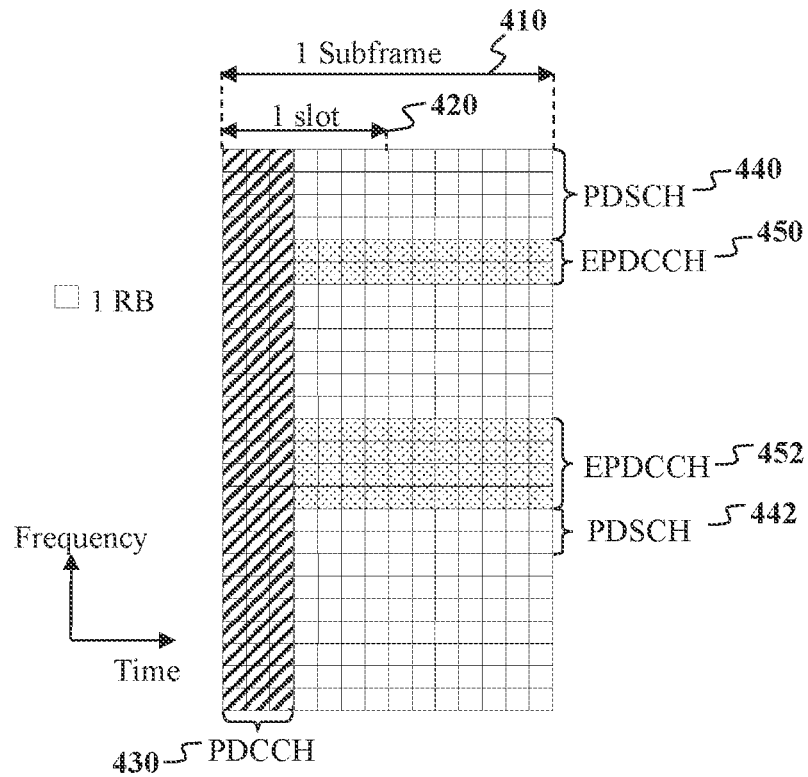
FIG. 4 illustrates a DL SF structure according to this disclosure.

FIG. 4 illustrates a DL SF structure according to this disclosure. The embodiment of the DL SF structure shown in FIG. 4 is for illustration only. Other embodiments could be used without departing from the scope of this disclosure.

A DL SF 410 includes two slots 420 and a total of $N_{symb}^{DL}$ symbols for transmitting of data information and DCI. The first $M_{symb}^{DL}$ SF symbols are used to transmit PDCCHs 430 and other control channels (not shown). The remaining Z SF symbols are primarily used to transmit PDSCHs 440 and 442, or EPDCCHs 450 and 452. A UE can be allocated $n_s = (n_{s0} + y \cdot N_{EPDCCH}) \bmod D$ RBs for a total of $Z = O_F + \lfloor (n_{s0} + y \cdot N_{EPDCCH}/D \rfloor$ REs for the PDSCH transmission BW. An EPDCCH transmission can be in one RB or in multiple of RBs.

Figure 5:
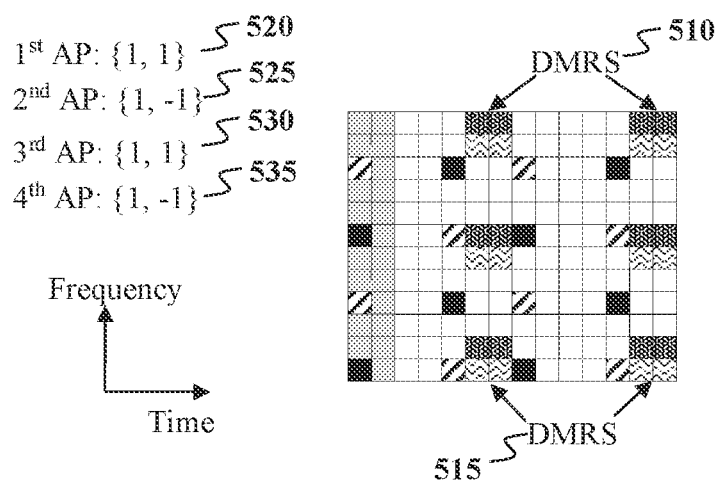
FIG. 5 illustrates a DMRS structure in one RB according to this disclosure.

FIG. 5 illustrates a DMRS structure in one RB according to this disclosure. The embodiment of the DMRS structure shown in FIG. 5 is for illustration only. Other embodiments could be used without departing from the scope of this disclosure.

DMRS REs 510 and 515 in a RB over a SF convey DMRS from four antenna ports (APs). For example, a DMRS transmission from a first AP applies an orthogonal covering code (OCC) of $\{1, 1\}$ 220 over two DMRS REs located in a same frequency position and are successive in the time domain while a second AP applies an OCC of $\{1, -1\}$ 525. For example, a DMRS transmission from a third AP is in different REs than from a first AP and applies an OCC of $\{1, 1\}$ 530 over two DMRS REs located in a same frequency position and are successive in the time domain while a fourth AP applies an OCC of $\{1, -1\}$ 535—see also REF 1. A UE receiver can estimate a channel experienced by a signal from an AP by removing a respective OCC at respective DMRS REs and also possibly by interpolating across respective DMRS REs.

The DMRS structure in FIG. 5 is associated with EPDCCH transmissions and with PDSCH transmissions with rank greater than 5. For a PDSCH transmission with rank of 1 or 2, only the first and second DMRS APs exist and the REs used for DMRS transmission from the third and fourth APs are used for data transmission.

There are two types of EPDCCH transmission; distributed and localized. For distributed EPDCCH transmission, each resource element in an EREG is associated with one of the first and third APs in FIG. 5 in an alternating manner, starting with the first AP. For localized EPDCCH transmission, a single AP is used that is determined as described in REF 1 and different APs are allocated to different EPDCCHs that are multiplexed in a same RB in a SF.

UL signals also include data signals conveying information content, control signals conveying UL control information (UCI), and RS. UE 114 transmits data information or UCI through a respective physical uplink shared channel (PUSCH) or a physical uplink control channel (PUCCH). When UE 114 simultaneously transmits data information and UCI, UE 114 can multiplex both in a PUSCH. UCI includes hybrid automatic repeat request acknowledgement (HARQ-ACK) information, indicating correct or incorrect detection of data transport blocks (TBs) in a PDSCH, scheduling request (SR) indicating whether UE 114 has data in its buffer, and channel state information (CSI) enabling eNB 102 to select appropriate parameters for PDSCH transmissions to UE 114. HARQ-ACK information includes a positive acknowledgement (ACK) in response to a correct EPDCCH or data TB detection, a negative acknowledgement (NACK) in response to an incorrect data TB detection, and an absence of a EPDCCH detection (DTX) that can be implicit (that is, UE 114 does not transmit a HARQ-ACK signal) or explicit when UE 114 can identify missed EPDCCHs by other means (it is also possible to represent NACK and DTX with a same NACK/DTX state). UL RS includes DMRS and sounding RS (SRS)—see also REF 1. DMRS is transmitted only in a BW of a respective PUSCH or PUCCH and eNB 102 can use a DMRS to demodulate information in a PUSCH or PUCCH.

DCI can serve several purposes. A DCI format in a respective EPDCCH includes several fields, or information elements (IEs), for scheduling a PDSCH or a PUSCH transmission conveying data information to or from UE 114, respectively. UE 114 always monitors a DCI format 1A for PDSCH scheduling and a DCI format 0 for PUSCH scheduling (see also REF 2). These two DCI formats are designed to always have a same size and are jointly referred to as DCI Format 0/1A. Another DCI format, DCI format 1C, in a respective EPDCCH can schedule a PDSCH providing system information (SI) to a group of UEs for network configuration parameters, or a response to a random access (RA) by UEs, or paging information to a group of UEs, and so on. Another DCI format, DCI format 3 or DCI format 3A (jointly referred to as DCI format 3/3A) can provide to a group of UEs transmission power control (TPC) commands for transmissions of respective PUSCHs or PUCCHs (see also REF 2).

A DCI format includes cyclic redundancy check (CRC) bits in order for UE 114 to confirm a correct detection. A DCI format type is identified by a radio network temporary identifier (RNTI) that scrambles the CRC bits. For a DCI format scheduling a PDSCH or a PUSCH to a single UE (unicast scheduling), the RNTI is a cell RNTI (C-RNTI). For a DCI format scheduling a PDSCH conveying SI to a group of UEs (broadcast scheduling), the RNTI is a SI-RNTI. For a DCI format scheduling a PDSCH providing a response to a RA from a group of UEs, the RNTI is a RA-RNTI. For a DCI format scheduling a PDSCH paging a group of UEs, the RNTI is a P-RNTI. For a DCI format providing TPC commands to a group of UEs, the RNTI is a TPC-RNTI. Each RNTI type is configured to a UE through higher layer signaling (and the C-RNTI is unique for each UE).

Figure 6:
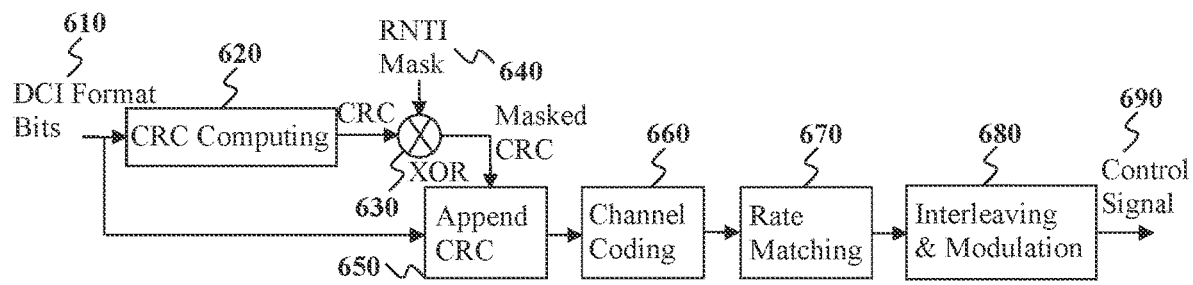
FIG. 6 illustrates an encoding process for a DCI format according to this disclosure.

FIG. 6 illustrates an encoding process for a DCI format according to this disclosure. The embodiment of the encoding process shown in FIG. 6 is for illustration only. Other embodiments could be used without departing from the scope of this disclosure.

The eNB 102 separately codes and transmits each DCI format in a respective EPDCCH. A RNTI for a UE that a DCI format is intended for masks a CRC of a DCI format codeword in order to enable the UE to identify the DCI format. The CRC of (non-coded) DCI format bits 610 is computed using a CRC computation operation 620, and the CRC is then masked using an exclusive OR (XOR) operation 630 between CRC and RNTI bits 640. The XOR operation 330 is defined as: XOR(0,0)=0, XOR(0,1)=1, XOR(1,0)=1, XOR(1,1)=0. The masked CRC bits are appended to DCI format information bits using a CRC append operation 650, channel coding is performed using a channel coding operation 660 (such as a tail-biting convolutional code (TBCC)), followed by rate matching 670 to allocated resources, and finally, an interleaving and a modulation 680 operation are performed, and the output control signal 690 is transmitted. In the present example, both a CRC and a RNTI include 16 bits.

Figure 7:
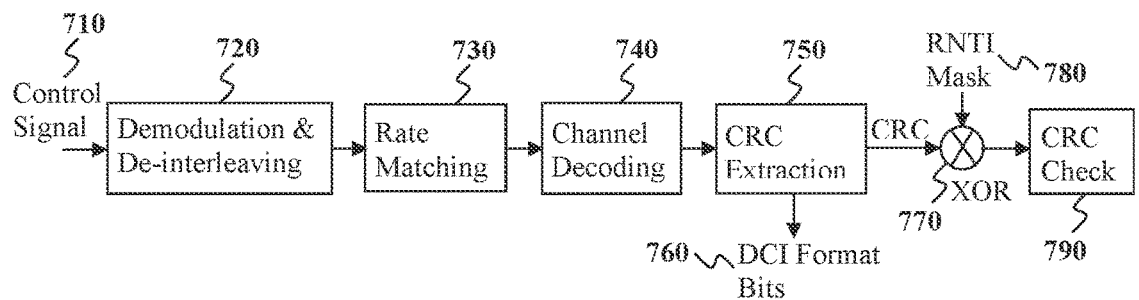
FIG. 7 illustrates an decoding process for a DCI format according to this disclosure.

FIG. 7 illustrates a decoding process for a DCI format according to this disclosure. The embodiment of the decoding process shown in FIG. 7 is for illustration only. Other embodiments could be used without departing from the scope of this disclosure.

A UE receives control signal 710 is demodulated and the resulting bits are de-interleaved at operation 720, a rate matching applied at eNB 102 transmitter is restored through operation 730, and data is subsequently decoded at operation 740. After decoding the data, DCI format information bits 760 are obtained after extracting CRC bits 750 that are then de-masked 770 by applying the XOR operation with a UE RNTI 780. Finally, UE 114 performs a CRC test 790. If the CRC test passes and the contents of the DCI format are valid, UE 114 determines that a DCI format corresponding to the received control signal 710 is valid and determines parameters for signal reception or signal transmission; otherwise, UE 114 disregards the presumed DCI format.

The eNB 102 separately codes and transmits a DCI format in a respective EPDCCH. To avoid an EPDCCH transmission to UE 114 blocking an EPDCCH transmission to another UE, a location of each EPDCCH transmission in the time-frequency domain of a DL control region is not unique and, as a consequence, UE 114 needs to perform multiple decoding operations to determine whether there is an EPDCCH intended for it. REs carrying a PDCCH or an EPDCCH are grouped into control channel elements (CCEs) or ECCEs, respectively, in the logical domain. Referring to EPDCCH, for a given number of DCI format bits, a number of ECCEs for a respective EPDCCH depends on a channel coding rate (quadrature phase shift keying (QPSK) is assumed as the modulation scheme) required to achieve a desired EPDCCH detection reliability such as a desired block error rate (BLER). The eNB 102 can use a lower channel coding rate (more ECCEs) for EPDCCH transmissions to UEs experiencing low DL signal-to-interference and noise ratio (SINR) than to UEs experiencing a high DL SINR. ECCE aggregation levels can consist, for example, of 1, 2, 4, 8, 16, and possibly 32 ECCEs (see also REF5).

Each ECCE consists of multiple enhanced resource element groups (EREGs). There are 16 EREGs, numbered from 0 to 15, per PRB pair. An EREG with number k in a PRB pair is obtained by numbering all REs, except REs carrying DMRS, in a PRB pair cyclically from 0 to 15 in an increasing order of first frequency and then time and using all REs with number k to form EREG k (see also REF 1). The eNB 102 can configure UE 114 to monitor one or two sets of PRB pairs (EPDCCH sets) for EPDCCH transmissions. All EPDCCH candidates in EPDCCH set $X_m$ use either only localized or only distributed transmission as configured by higher layers. Within EPDCCH set $X_m$ in SF i, ECCEs are numbered from 0 to $N_{ECCE,m,i}-1$ and ECCE number n corresponds to EREGs numbered (n mod $N_{ECCE}^{RB}$)+$jN_{ECCE}^{RB}$ in PRB index $\lfloor n/N_{ECCE}^{RB}\rfloor$ for localized mapping, and EREGs numbered $\lfloor n/N_{RB}^{X_m}\rfloor+jN_{ECCE}^{RB}$ in PRB indices (n+j max(1, $N_{RB}^{X_m}/N_{EREG}^{ECCE}$))mod $N_{RB}^{X_m}$ for distributed mapping, where j=0, 1, ..., $N_{EREG}^{ECCE}-1$, $N_{EREG}^{ECCE}$ is the number of EREGs per ECCE, and $N_{ECCE}^{RB}=16/N_{EREG}^{ECCE}$ is the number of ECCEs PRB pair. The PRB pairs constituting EPDCCH set $X_m$ are numbered in ascending order from 0 to $N_{RB}^{X_m}-1$ where the possible values for $N_{RB}^{X_m}$ are 2, 4, and 8. Therefore, for distributed mapping, an ECCE includes EREGs from all PRB pairs constituting EPDCCH set $X_m$.

For a narrowband of 6 RBs, an ECCE for distributed mapping is not defined as $N_{RB}^{X_m}$ cannot be 6. One option is to re-use the ECCE mapping for $N_{RB}^{X_m}=8$ and remove EREGs that are mapped in RBs that are not included in the 6 RBs of a narrowband. Another option is to redefine the mapping of EREGs to an ECCE and introduce support for $N_{RB}^{X_m}=6$. However, both options complicate implementation for eNB 102 and UE 114 as they cannot be supported by existing mapping for the case that $N_{RB}^{X_m}$ is 2, 4, and 8 and, for the second option, EPDCCH transmissions to non-LC UEs and MPDCCH transmissions to LC/CE UEs cannot be multiplexed in a newly defined set of 6 RBs.

For an EPDCCH decoding process, UE 114 can determine a search space for candidate EPDCCH transmissions in a DL control region after UE 114 restores ECCEs in the logical domain according to a UE-common set of ECCEs (Common Search Space or CSS) and according to a UE-specific set of ECCEs (UE-specific search space or USS)—see also REF 3. A CSS can be used to transmit EPDCCHs for DCI formats associated with UE-common control information and use a RA-RNTI, a P-RNTI, a TPC-RNTI, and so on, to scramble the respective CRCs. A USS can used to transmit EPDCCHs for DCI formats associated with UE-specific control information and use respective C-RNTIs to scramble respective CRCs.

One of the fundamental requirements in an operation of a communication system is a capability for UE 114 to request a connection setup with eNB 102; such request is commonly referred to as random access (see also REF 4). Random access is used for several purposes, including: initial access when establishing a radio link; re-establishing a radio link after radio-link failure, handover when UL synchronization needs to be established to a new cell, UL synchronization, UE positioning based on UL measurements, and as a SR if no dedicated SR resources have been configured on a PUCCH. Acquisition of UL timing by eNB 102 is one of the main objectives of random access; when establishing an initial radio link, a random-access process also serves for assigning a unique identity through a C-RNTI to UE 114. Either a contention based (multiple UEs may use same resources) or a contention-free (a dedicated resource is used by UE 114) scheme can be used.

Figure 8:
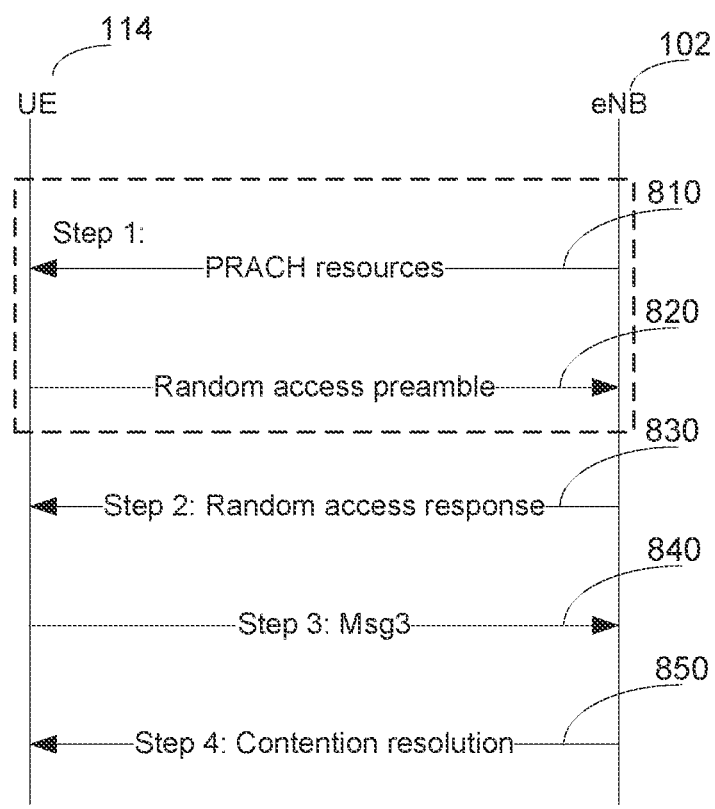
FIG. 8 illustrates a random access process according to this disclosure.

FIG. 8 illustrates a random access process according to this disclosure. While the signaling diagram depicts a series of sequential signals, unless explicitly stated, no inference should be drawn from that sequence regarding specific order of performance, performance of steps or portions thereof serially rather than concurrently or in an overlapping manner, or performance of the signals depicted exclusively without the occurrence of intervening or intermediate signals. The process depicted in the example depicted is implemented by a transmitter chains in, for example, a UE and a base station.

As shown in FIG. 8, in Step 1, UE 114 acquires information of physical random access channel (PRACH) resources 810 from an eNB 102. UE 114 determines resources for a random access (RA) preamble transmission 820 and transmits the RA preamble to eNB 102. In Step 2, UE 114 receives a random access response 830 from eNB 102. In Step 3, UE 114 transmits what is referred to as message 3 (Msg3) 840 to eNB 102. In Step 4, eNB 102 and UE 114 perform contention resolution 850. The contention resolution 850 message also is referred to as message 4 (Msg4).

In certain embodiments, in Step 1, UE 114 acquires a system information block (SIB) that conveys information for PRACH resources 810 as well as RA preamble format (see also REF 1). PRACH resources 810 consist of a set of (see also REF 1): SFs where a PRACH transmission can occur; RBs where a PRACH can be transmitted in the frequency domain; and a number of $(64-N_{cf})$ Zadoff-Chu (ZC) sequences from which UE 114 can select to use for generating a PRACH transmission ($N_{cf}$ is a number of ZC sequences reserved by eNB 102 to use for contention-free PRACH transmissions). UE 114 identifies PRACH resources 810 and a RA preamble format and transmits the RA preamble 820 on the determined PRACH resources thereby allowing eNB 102 to estimate transmission timing for UE 114. UL synchronization is necessary as otherwise a UE cannot properly communicate other UL signaling to an eNB.

In Step 2, upon detecting a RA preamble 820 transmitted from UE 114, eNB 102 transmits a random access response (RAR) 630 including a timing advance (TA) command for UE 114 to adjust its transmission timing, an RA preamble that eNB 102 detected, an UL grant assigning UL resources for UE 114 to transmit a message 3 (Msg3) in a PUSCH, and a temporary C-RNTI (TC-RNTI). The RAR is transmitted in a PDSCH and the PDSCH can include multiple RARs corresponding to RA preambles detected by eNB 102. Upon failing to detect a transmitted RA preamble in a RAR within a RAR time window configured by eNB 102 through a SIB, UE 114 retransmits a new RA preamble (i.e., repeats the first step). UE 114 also can perform power ramping to adjust a transmission power of UE 114.

In Step 3, UE 114 transmits Msg3 840 in a PUSCH where Msg3 840 can include a TC-RNTI. The exact contents of Msg3 depends upon the state of UE 114, in particular, whether UE 114 previously connected to eNB 102 or not. When eNB 102 does not correctly detect a Msg3 from UE 114, eNB 102 can schedule a retransmission for Msg3 from UE 114.

In Step 4, eNB 102 transmits a contention-resolution message 850 to UE 114 in a PDSCH. Step 4 also resolves any contention issue that may arise when multiple UEs try to access a network using a same RA preamble.

Once a random access process is successful, the TC-RNTI is converted to C-RNTI. Step 1 uses physical-layer processing specifically designed for a random access process. The subsequent three steps utilize a same physical-layer processing as for PDSCH or PUSCH transmissions after UE 114 has established communication with eNB 102 where Step 2 does not use HARQ retransmissions while Step 3 and Step 4 use HARQ retransmissions.

Contention-free random access can only be used for reestablishing UL synchronization upon DL data arrival, handover, and positioning. Only Step 1 and Step 2 of the random access process described above are used as there is no need for contention resolution in a contention-free scheme where Step 2 can deliver C-RNTI instead of TC-RNTI.

Machine type communications (MTC) or Internet of Things (IoT) refers to communication of automated devices in a network. MTC through cellular networks is emerging as a significant opportunity for new applications in a networked world where devices communicate with humans and with each other. Compared to typical human communication, MTC typically has relaxed latency and Quality of Service (QoS) requirements and often does not require mobility support. However, MTC also requires that respective UEs have reduced cost (LC UEs) and reduced power consumption compared to UEs for human communications. MTC UEs can be used for a wide variety of applications in different sectors including healthcare, such as monitors, industrial, such as safety and security, energy, such as meters and turbines, transport, such as fleet management and tolls, and consumer and home, such as appliances and power systems.

Important requirements for commercial success of MTC are for respective UEs to have low power consumption and significantly lower cost than UEs serving human communications. These requirements can be realized, among other sources such as constraining a transmission BW and a reception BW to a small value such as a narrowband of 6 RBs or by reducing a maximum data TB size (TBS) that can be transmitted or received, by limiting a power amplifier gain or by reducing a number of receiver antennas. This can lead to reduced coverage for MTC UEs relative to UEs for typical human communications. The coverage for MTC UEs can be further degraded by a location of MTC UEs that can be in basements of buildings or, in general, in locations where propagation of radio signals experiences substantial path-loss. For these reasons, it is important for a communication system supporting MTC UEs to support coverage enhancements (CE) for communications with MTC UEs (LC/CE UEs).

LC/CE UEs can require operation with enhanced coverage. In extreme poor coverage scenarios, LC/CE UEs can have characteristics such as very low data rate, greater delay tolerance, and limited mobility, thereby potentially being capable to operate without some messages/channels. Not all LC/CE UEs require CE or require a same amount of CE. In addition, in different deployment scenarios, a required CE level can be different for different eNB s, for example depending on an eNB transmission power or an associated cell size or number of receiver antennas, as well as for different LC/CE UEs, for example depending on a location of a LC/CE UE.

LC/CE UE 114 or eNB 102 can support CE by repeating transmissions of channels either in a time domain or in a frequency domain. LC/CE UE 114 operating with CE can be configured by eNB 102 with a number of SFs for repetitions of a DL transmission or an UL transmission. For example, LC/CE UE 114 can be configured by eNB 102 a first number of repetitions for a PDSCH transmission, a second number of repetitions for a PUSCH transmission, and so on.

A DL control channel for LC/CE UE 114 can be based on the EPDCCH structure but can also have different characteristics than the EPDCCH for non-LC UEs and it is referred to as MPDCCH. In order to minimize a number of SFs that LC/CE UE 114 needs to receive a PDSCH or an MPDCCH, respective transmissions can be over all RBs where LC/CE UE 114 can receive in a SF, such as in a narrowband of 6 contiguous RBs, as eNB 102 is assumed to not be power limited.

An inability of LC/CE UEs to receive over a large DL BW can create capacity constraints for MPDCCH transmissions that need to occur within a small number of SFs as, in case that an MPDCCH is transmitted with repetitions, only one MPDCCH transmission can occur over a number of sub-frames. This can be problematic for MPDCCH transmissions associated with a RA process as eNB 102 can have requirements for MPDCCH transmissions associated with scheduling PDSCH transmissions conveying RAR messages, scheduling PUSCH transmissions conveying Msg3 retransmissions, scheduling PDSCH transmissions conveying Msg4, or scheduling PDSCH transmissions conveying an RRC connection setup.

Therefore, there is a need to support MPDCCH transmissions.

There is another need to define EREGs forming ECCEs for an MPDCCH transmission over a narrowband of 6 RBs.

There is another need to enable MPDCCH transmissions in first one or more narrowbands for scheduling PDSCH conveying RAR messages, in second one or more narrowbands for scheduling PUSCH transmissions conveying Msg3 retransmissions, PDSCH transmissions conveying Msg4, or PDSCH transmissions conveying RRC connection setup, or in third one or more narrowbands for scheduling unicast PDSCH or PUSCH transmissions in order to alleviate an MPDCCH capacity constraint.

Finally, there is another need to schedule PUSCH transmissions conveying Msg3 retransmissions.

Certain embodiments of this disclosure provide mechanisms to support MPDCCH transmissions. Certain embodiments of this disclosure also provide mechanisms for an MPDCCH transmission over a narrowband of 6 RBs. Additionally, certain embodiments of this disclosure provide mechanisms to enable MPDCCH transmissions in first one or more narrowbands for scheduling PDSCH conveying RAR messages, in second one or more narrowbands for scheduling PUSCH transmissions conveying Msg3 retransmissions, PDSCH transmissions conveying Msg4, or PDSCH transmissions conveying RRC connection setup, or in third one or more narrowbands for scheduling unicast PDSCH or PUSCH transmissions in order to alleviate an MPDCCH capacity constraint. Further, certain embodiments of this disclosure provide mechanisms to schedule PUSCH transmissions conveying Msg3 retransmissions.

The following embodiments are not limited to LC/CE UEs and can be applicable to any type of UEs requiring CE. This includes UEs that can receive over the entire DL system BW or transmit over the entire UL system BW large data TBs at a given time instance (non-LC UEs). In the following, for brevity, FDD (including half-duplex FDD) is considered as the duplex method for both DL and UL signaling but the embodiments of the disclosure are also directly applicable to TDD. MPDCCH or PDSCH transmission to LC/CE UE 114 and PUCCH or PUSCH transmissions from LC/CE UE 114 can be without repetitions or with repetitions in a number of SFs supporting transmissions to LC/CE UE 114 or transmissions from LC/CE UE 114.

Various embodiments of the present disclosure provide a RB-based MPDCCH structure and RE mapping.

An MPDCCH transmission to LC/CE UE 114 can span all RBs or a subset of RBs in a narrowband of a DL system BW where the LC/CE UE can receive DL transmissions. This can allow eNB 102 to transmit an MPDCCH to LC/CE UE 114 with a minimum number of repetitions over a respective minimum number of DL SFs.

When an MPDCCH transmission to LU/CE UE 114 occupies an entire narrowband where LC/CE UE 114 can receive DL transmissions, there is no multiplexing of MPDCCH (or PDSCH) transmissions to other LC/CE UEs (or non-LC UEs) in the narrowband in the DL SFs where eNB 102 transmits the MPDCCH to LC/CE UE 114. Moreover, there is limited, if any, frequency diversity in a narrow band of a few RBs or in 1 RB. Therefore there is no need to define. EREGs over a narrowband in order to capture frequency diversity for an ECCE and therefore for an associated MPDCCH transmission. Consequently, there is no need to define EREGs as a component unit of an ECCE for an MPDCCH transmission to LC/CE UE 114.

A mapping to REs of DCI format symbols conveyed by an MPDCCH transmission a narrowband can be in increasing order of first the frequency domain index k over the narrowband and then the time domain index l starting from a first symbol available for MPDCCH transmission in a DL SF. In this manner, a common mapping to REs is achieved for data symbols in a PDSCH and for DCI format symbols in an MPDCCH. LC/CE UE 114 can determine a first available symbol for an MPDCCH reception in a DL SF based on higher layer signaling from eNB 102 that can be provided, for example, in a Master Information Block (MIB) or in a SIB—see also REF 5.

Figure 9:
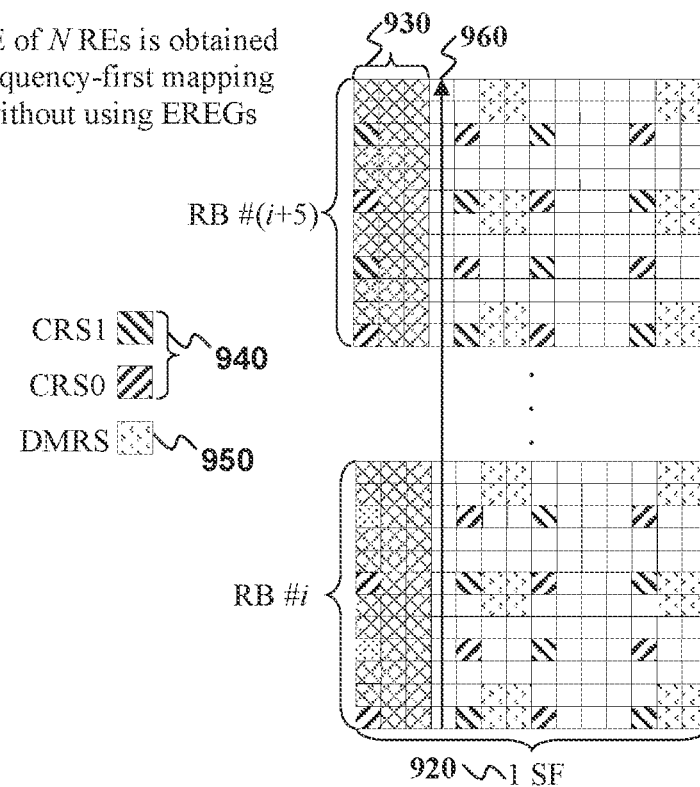
FIG. 9 illustrates a mapping of an ECCE for an MPDCCH transmission according to this disclosure.

FIG. 9 illustrates a mapping of an ECCE for an MPDCCH transmission according to this disclosure.

After encoding and modulation, eNB 102 generates $M_{DCI}$ symbols for a DCI format to be transmitted in an MPDCCH in a narrowband of 6 RBs, from RB #i 905 to RB #(i+5) 910, in one DL SF 920. The $M_{DCI}$ symbols are mapped to available REs in a same manner as for mapping data symbols. REs corresponding to a DL control region where eNB 102 can transmit PDCCH 910, REs corresponding to CRS 920 (two CRS APs are assumed), and REs corresponding to DMRS 930 are excluded from the mapping of the $M_{DCI}$ symbols. Such exclusion of REs also holds for MPDCCH REs overlapping with REs conveying system information (MIB or SIB) or synchronization signals. Remaining REs in the narrowband of 6 RBs in a DL SF are used to map the $M_{DCI}$ symbols starting from the first available SF symbol and the lowest RE index, continuing across RE indexes, and repeating for remaining SF symbols 940 (frequency-first mapping). When eNB 102 informs LC/CE UE 114 of CSI-RS configurations, LC/CE UE 114 can assume that the $M_{DCI}$ symbols are not mapped to CSI-RS REs.

Typically, a number of REs available for mapping $M_{DCI}$ symbols of a DCI format over available REs in a narrowband of 6 RBs in a DL SF is much larger than $M_{DCI}$. For example, there can be $M_{RE}$=576 available REs, that can correspond to 16 ECCEs of 36 REs per ECCE, for mapping $M_{DCI}$ symbols of a DCI format while for a DCI format size of 32 bits (including CRC bits), QPSK modulation, and 1/3 tail-biting convolutional coding, it is $M_{DCI}$=(32·3)/2=45. Therefore, there can be $M_{RE}/M_{DCI}$=12.8 repetitions of the encoded DCI format symbols in a narrowband of 6 RBs over a DL SF while one ECCE of 36 REs can allow MPDCCH transmission with code rate of 32/(2*36)=0.44. At a next SF, mapping of DCI format symbols to REs is as in a current SF and the mapping does not continue from the last DCI format symbol that is mapped in the current SF. This can enable simple combining of REs, as a same DCI format symbol is mapped to a same RE, and can allow flexibility to eNB 102 to select any number of SFs to use for repetitions of an MPDCCH transmission. Moreover, a number of available REs can vary per DL SF, for example as a LC/CE UE 114 can be informed of CSI-RS configurations for CSI-RS transmission in some SFs or because an MPDCCH transmission can overlap with other transmission such as for a physical broadcast channel (PBCH), a PDSCH conveying a SIB, and so on. Puncturing of respective MPDCCH symbols that are mapped to same REs as such other transmissions can then apply and LC/CE UE 114 can assume that eNB 102 does not transmit DCI format symbols mapped to REs that can be used, for example, for CSI-RS transmission according to a CSI-RS configuration signaled by higher layers from eNB 102.

Mapping repetitions of an MPDCCH transmission to all 6 RBs of f narrowband where LC/CIE UE 114 can receive DL signaling can provide an SINR gain in the order of 10 $\log_{10}(M_{RE}/M_{DCI})$ dB or, for the example of FIG. 9, about 11 dB. Such large SINR gains can be unnecessary for some LC/CE UEs. For example, a maximum CE level that eNB 102 needs to support can be about 5-6 dB. Then, LC/CE UE 114 can be additionally configured with a number of 2 RBs or 4 RBs, in a narrowband of 6 RBs, to receive an MPDCCH transmission instead of always receiving an MPDCCH transmission over the whole narrowband of 6 RBs.

Figure 10:
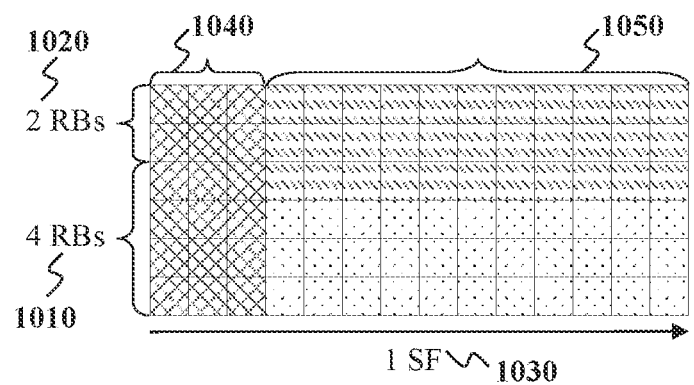
FIG. 10 illustrates a multiplexing of MPDCCH transmissions to two LC/CE UEs in a narrowband of 6 RBs according to this disclosure.

FIG. 10 illustrates a multiplexing of MPDCCH transmissions to two LC/CE UEs in a narrowband of 6 RBs according to this disclosure.

The eNB 102 configures a first LC/CE UE, such as LC/CE UE 114, for repetitions of encoded DCI format symbols in first 4 RBs of a narrowband 1010 and configures a second LC/CE UE for repetitions of encoded DCI format symbol in second 2 RBs of the narrowband 1020 over a DL SF 1030. The eNB 102 informs the LC-UEs to exclude the first three SF symbols 1040 from reception for repetitions of respective encoded DCI format symbols that are transmitted in the remaining symbols of the DL SF 1050.

The RBs allocated to each of the two LC/CE UEs in FIG. 10 are successive in the frequency domain in order to enable DMRS interpolation across RBs and improve an accuracy of a channel estimate. This assumes that a same precoding applies to DMRS transmissions in successive RBs. An alternate mapping can also apply such as, for example, allocating every third RB of the 6 RBs to the second LC/CE UE. Also, some frequency diversity or interference randomization can be provided by reversing the order of the RBs allocated to the first LC/CE UE or the second LC/CE UE after a number of DL SFs. Although FIG. 10 illustrates multiplexing of two LC/CE UEs, the principle in FIG. 10 can be extended for a larger number of LC/CE UEs, such as three LC/CE UEs wherein each LC/CE UE is allocated 2 RBs, or for LC/CE UEs that are allocated a different number of RBs such as, for example, 4 RBs for a third LC/CE UE and 2 RBs for a fourth LC/CE UE.

Various embodiments of the present disclosure provide a DMRS mapping for an MPDCCH transmission.

For distributed MPDCCH transmission, each RE can the associated with one out of two APs in an alternating manner, starting from the first AP. A DMRS structure remains as in FIG. 5 but, unlike EPDCCH transmission where each AP is associated with each EREG in an alternating manner, for MPDCCH transmission each AP is associated with each RE in an alternating manner (also, use of an EREG can be avoided for an MPDCCH transmission as in the embodiments described above). Only REs available for mapping DCI format symbols can be considered for the association or the association can also include CRS REs or LAIRS REs in the SF symbols available for mapping DCI format symbols.

For localized MPDCCH transmission, even when a single MPDCCH is transmitted in a RB, a same DMRS structure as for a PDSCH transmission with rank greater that two can be maintained in order to improve an accuracy of a channel estimate by increasing a number of LAIRS REs. Therefore, even though are MPDCCH transmission can be from a single AP, a transmission for the associated DMRS is repeated in all four DMRS REs in FIG. 5.

Figure 11:
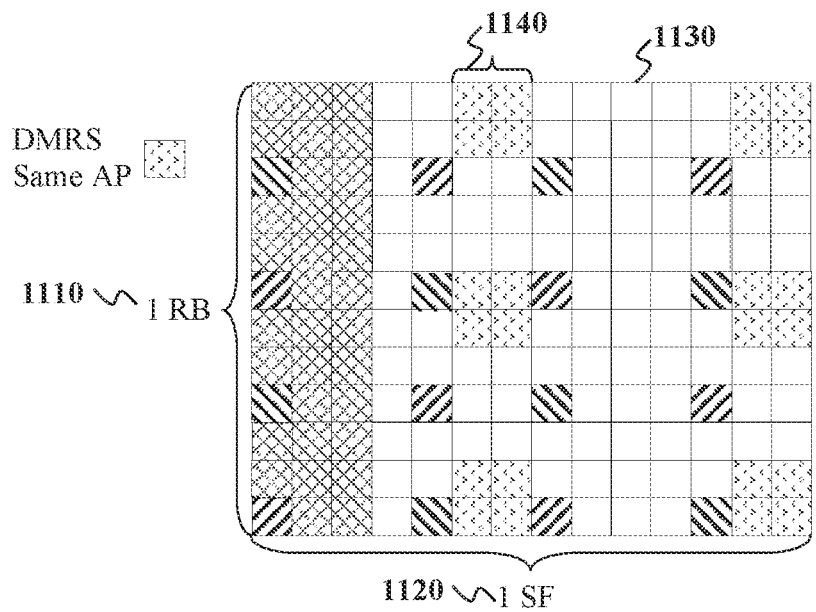
FIG. 11 illustrates a DMRS transmission for localized MPDCCH transmission to a LC/CE UE in a RB according to this disclosure.

FIG. 11 illustrates a DMRS transmission for localized MPDCCH transmission to a LC/CE UE in a RB according to this disclosure.

LC/CE UE 114 receives an MPDCCH in a RB 1110 over a DL SF 1120. MPDCCH transmission is localized with a same precoding applied to all respective DO format symbols 1130 and to DMRS 1140 in the RB. The DMRS transmission from a single AP is repeated in more than two REs, for example in quadruples of adjacent REs in the time-frequency domain.

Various embodiments of the present disclosure provide an EREG-based MPDCCH structure for a LC/CE UE.

An MPDCCH structure for LC/CE UEs that do not require CE can have a same structure as for LC/CE UEs that require CE and only a number of allocated RBs can vary. For example, a LC/CE UE that does not require CE for an MPDCCH transmission can be configured to receive an MPDCCH in one RB or in a few RBs. This can allow for improved multiplexing of MPDCCH transmissions among LC/CE UEs.

In one embodiment, to allow multiplexing of DL control signaling transmissions to non-LC UEs and to LC/CE UEs for a potentially improved DL spectrum utilization, an MPDCCH structure for LC/CE UEs configured to operate without CE can be same as an MPDCCH structure and have an EREG as a unit for forming ECCEs. Then, MPDCCH transmissions to LC/CE UEs and EPDCCH transmissions to non-LC UEs can be multiplexed in a set of consecutive 2 RBs or 4 RBs. However, in order to minimize a cost for a LC/CE UE, such as LC/CE UE 114, a number of MPDCCH decoding operations can be lower than a number of EPDCCH decoding operations for a non-LC UE.

A number of MPDCCH decoding operations that LC/CE UE 114 performs in a SF can be reduced by not supporting certain ECCE aggregation levels or by supporting a reduced number of candidates for other ECCE aggregation levels. A potential increase in a blocking probability for an MPDCCH transmission to LC/CE UE 114 is not a significant concern as typical applications are not delay sensitive. For example, as LC/CE UE 114 is likely to be equipped with one receiver antenna, LC/CE UE 114 need not be configured to decode MPDCCH candidates with an aggregation level of 1 ECCE as LC/CE UE 114 is unlikely to have a required SINR to achieve a target BLER of about 1% for detection of an MPDCCH transmitted over only one ECCE. For example, a maximum number of MPDCCH decoding operations in a USS for LC/CE UE 114 can be 8 and a maximum number of EPDCCH decoding operations in USS for a non-LC UE can be 32. A DCI format with same size can be used for scheduling PDSCH transmissions to or PUSCH transmissions from LC/CE UE 114. For example, MPDCCH decoding operations per ECCE aggregation level can be configured to a LC/CE UE 114 by eNB 102 through higher layer signaling such as RRC signaling.

For a set of 4 RBs, Table 1 and Table 2 give an example number of MPDCCH candidates for LC/CE UE 114. A number of MPDCCH candidates per ECCE aggregation level is assumed to be same for a localized MPDCCH transmission and for a distributed MPDCCH transmission. However, different numbers of MPDCCH candidates per ECCE aggregation level can also apply.

TABLE 1

MPDCCH candidates monitored by a LC/CE UE for One RB Set

| Number of RBs in a Set $N_{RB}^{Xp}$ | Number of MPDCCH candidates $M_p^{(L)}$ | | | | |
|---|---|---|---|---|---|
| | L = 1 | L = 2 | L = 4 | L = 8 | L = 16 |
| 2 | 0 | 2 | 3 | 2 | 1 |
| 4 | 0 | 2 | 3 | 2 | 1 |

TABLE 2

MPDCCH candidates monitored by a LC/CE UE for Two RB Sets

| $N_{RB}^{Xp1}$ | $NRB^{Xp2}$ | Number of MPDCCH candidates $[M_{p1}^{(L)}, M_{p2}^{(L)}]$ | | | | |
|---|---|---|---|---|---|---|
| | | L = 1 | L = 2 | L = 4 | L = 8 | L = 16 |
| 2 | 2 | 0.0 | 1.1 | 2.1 | 1.1 | 1.0 |
| 4 | 2 | 0.0 | 1.1 | 2.1 | 1.1 | 1.0 |

The eNB 102 can configure LC/UE 114 with use of two RB sets for MPDCCH transmissions when LC/CE UE 114 is configured by eNB 102 with a first set of $N_{RB}^{Xp1}=4$ RBs and a second set of $N_{RB}^{Xp2}=2$ RBs (or, equivalently, with a first set of $N_{RB}^{Xp1}=2$ RBs and a second set of $N_{RB}^{Xp2}=4$ RBs), where the first set of RBs and the second set of RBs form a narrowband of 6 consecutive RBs. Then, a same EREG definition as for an EPDCCH can apply within each of the two sets of RBs but a single MPDCCH candidate can exist that includes all ECCEs in the first set of RBs and in the second set of RBs. An ECCE does not need to be defined to include EREGs over a set of 6 RBs. For an allocation of a single MPDCCH candidate over a narrowband of 6 RBs in a single SF or, equivalently for an aggregation level of 24 ECCEs, LC/CE UE 114 can also monitor a single MPDCCH candidate with an aggregation level of 16 ECCEs in the first set of $N_{RB}^{Xp1}=4$ RBs (and an aggregation level of 8 ECCEs the first set of $N_{RB}=4$ RBs or in the second set of $N_{RB}^{Xp2}=2$ RBs). LC/CE UE 114 can also monitor a single MPDCCH candidate over the narrowband of 6 RBs in two SFs and possibly additional MPDCCH candidates over the narrowband of 6 RBs in more SFs such as an additional MPDCCH candidate over the narrowband in four SFs. Therefore, when LC/CE UE 114 monitors an MPDCCH candidate over a narrowband of 6 RBs in a SF, LC/CE UE 114 can also monitor at least one MPDCCH candidate corresponding to non-CE operation, such as one MPDCCH candidate with aggregation level of 16 ECCEs over a set of 4 RBs in a SF or two MPDCCH candidates each with aggregation level of 8 ECCEs over a set of 4 RBs or one MPDCCH candidate with aggregation level of 8 ECCEs over a set of 2 RBs in a SF.

Figure 12:
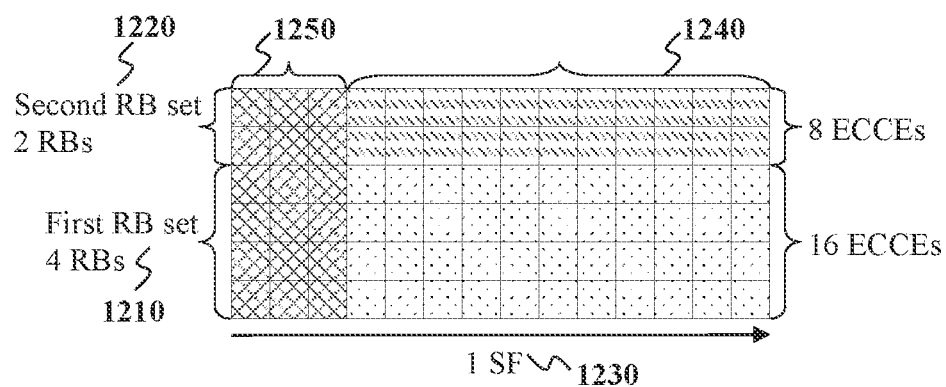
FIG. 12 illustrates an allocation of MPDCCH candidates for a LC/CE UE according to this disclosure.

FIG. 12 illustrates an allocation of MDCCH candidates for a LC/CE UE according to this disclosure.

LC/CE UE 114 monitors a first MPDCCH candidate with an ECCE aggregation level of 24 ECCEs that is obtained by aggregating 16 ECCEs from a first RB set 1210 and 8 ECCEs from a second RB set 1220 in a SF 1230. The two sets of RBs include RBs with consecutive indexes. The ECCEs include REs 1240 that are obtained after excluding REs in symbols LC/CE UE is informed that can be used to transmit PDCCH 1250, CRS REs, DMRS REs, PBCH, and, when LC/CE UE 114 is informed of respective configurations, CSI-RS REs and positioning RS REs. LC/CE UE 114 can also monitor a second MPDCCH candidate with an aggregation level of 16 ECCEs that are included in the first set of RBs. LC/CE UE 114 can also monitor an MPDCCH candidate with an ECCE aggregation level of 48 ECCEs that is obtained by aggregating 24 ECCEs in the SF and in a second SF or with an aggregation level of 32 ECCEs that is obtained by aggregating 16 ECCEs in the SF and in the second RB set of a second SF (not shown).

Various embodiments of the present disclosure provide a CSS design for MPDCCH.

The eNB 102 provides information to LC/CE UE 114 for a set of narrowbands (or, equivalently, set of RBs) used for an MPDCCH transmission to LC/CE UE 114 scheduling a random access response (RAR) message, or a Message 3 (Msg3) retransmission, or a Message4 (Msg4) of a random access process (see also REF 3 and REF 4), or a PDSCH that conveys a RRCConnectionSetup (when it is not the PDSCH conveying Msg4) that is a higher layer message providing information for LC CE UE 114 to establish an RRC connection with eNB 102. For MPDCCH scheduling a PDSCH conveying one or more RAR messages, a SIB can provide an indication of one or more narrowbands for the PDSCH transmission. For MPDCCH scheduling Msg3 retransmission or Msg4 transmission, a field (IE) in a RAR message to LC/CE UE 114 can indicate narrowbands (or set of RBs) for the MPDCCH transmission. Then, Msg3 retransmission or Msg4 transmission, or transmission of a PDSCH that conveys the RRCConnectionSetup (when not included in Msg4) can be scheduled by an MPDCCH transmitted in the set of narrowbands indicated in the RAR using a temporary C-RNTI (TC-RNTI) similar to scheduling Msg4 for a non-LC UE (see also REF 3). Subsequent RRC signaling provided in a PDSCH to LC/CE UE 114 can re-configure a set of narrowbands (or a set of RBs) where LC/CE UE 114 receives MPDCCH.

Figure 13:
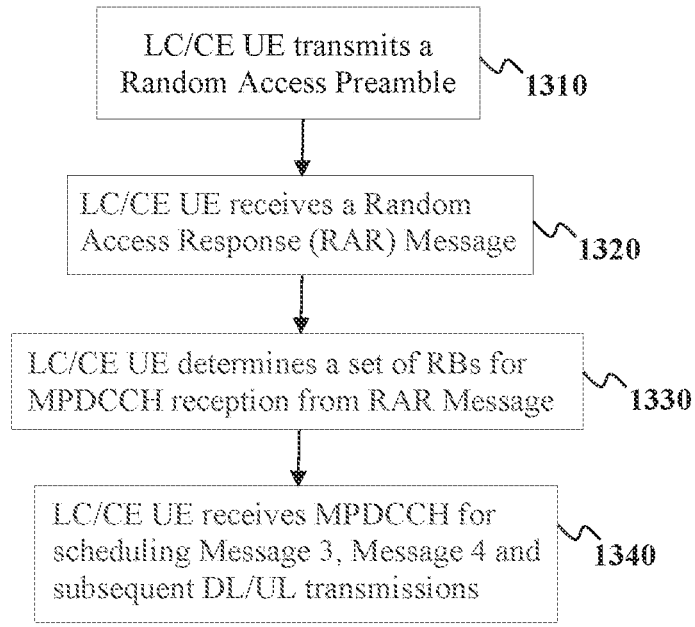
FIG. 13 illustrates a process for a configuration of RBs for MPDCCH reception to a LC/CE UE according to this disclosure.

FIG. 13 illustrates a process for a configuration of RBs for MPDCCH reception to a LC/CE UE according to this disclosure.

LC/CE UE 114 transmits a random access (RA) preamble to access eNB 102 1310. Upon detection of the RA preamble, eNB 102 transmits and LC/CE UP 114 receives a RAR message associated with the RA preamble 1320. The RAR message includes information for a set of narrowbands (or, equivalently, a set of RBs) where LC/CE UE 114 is configured to receive MPDCCH for scheduling PUSCH with Msg3 retransmissions of PDSCH conveying Msg4 or the RRCConnectionSetup 1330. The information can also include possible ECCE aggregation levels or numbers of repetitions for a DCI format or LC/CE UE 114 can implicitly determine these parameters based on a CE level for RAR reception or based on a CE level for the respective RA preamble transmission as these CE levels can have a one-to-one mapping to ECCE aggregation levels or numbers of repetitions for the DCI format. LC/CE UE 114 subsequently monitors MPDCCH transmission, according to parameters obtained from the RAR message, to detect a DCI format scheduling a PUSCH conveying a Msg3 retransmission or a PDSCH conveying a Msg4 transmission, or scheduling subsequent PDSCH providing information for establishing an RRC connection with eNB 102 1340.

Contents of a DCI format conveyed by an MPDCCH and scheduling a PDSCH transmission conveying a RAR are provided in Table 3. A same DCI format can be used for all CE levels associated with RA preamble transmissions as these CE levels are informed to LC/CE UEs by system information. A size of the DCI format is same as a size of a DCI format scheduling PDSCH transmission to LC/CE UE 114 or scheduling PUSCH transmission from LC/CE UE 114.

TABLE 3

Contents of DCI Format Scheduling a PDSCH conveying RAR

| DCI Field | Number of Bits | Comments |
| --- | --- | --- |
| UL/DL Flag | 1 | Identifying DL Scheduling of DCI Format |
| PDSCH Repetitions | 2 | Set of repetition numbers is indicated by SIBbis for respective RA preamble CE level |
| MPDCCH Repetitions | 2 | Set of repetition numbers is indicated by SIBbis for respective RA preamble CE level |
| PDSCH Narrowband index | ceil(log$_2$(N$_{NB}$)) | The narrowband index for RAR transmission is indicated by ceil(log$_2$(N$_{NB}$)) bits |
| MCS | 3 | QPSK only |
| NDI | Reserved | |
| HARQ Process Number | Reserved | |
| CRC/RA-RNTI | 16 | |

The gelds in the DCI format in Table 3 are:
a) UL/DL flag field: As the DCI format scheduling a PDSCH transmission is assumed to have a same size as a DCI format scheduling a PUSCH transmission, an UL/DL flag field serves to indicate whether the DCI format schedules a PDSCH transmission or a PUSCH transmission.
b) PDSCH repetitions field: Indicates a number of repetitions, from a predetermined set of numbers of repetitions, for a PDSCH transmission conveying the RAR message. The set of numbers of repetitions is signaled by eNB 102 through a SIB. LC/CE UE 114 determines the set of numbers of repetitions based on the CE level of the RA preamble transmission associated with the RAR the LC/CE UE 114 attempts to detect. LC/CE UE 114 needs to know the number of repetitions for the PDSCH transmission conveying the RAR in order to determine a first SF for a transmission of an Msg3 in a PUSCH.
c) MPDCCH repetitions field: Indicates a number of repetitions, from a predetermined set of numbers of repetitions, for the MPDCCH transmission scheduling the PDSCH transmission conveying the RAR. The set of numbers of repetitions are signaled by eNB 102 through a SIB, Similar to non-LC UEs, eNB 102 can signal a RAR window size for each CE level by a SIB, for example, as a multiple of the largest number of repetitions, from a set of numbers of repetitions for a corresponding CE level, for an MPDCCH transmission. LC/CE UE 114 determines the set of numbers of repetitions based on the CE level of the RA preamble transmission associated with the RAR that LC/CE UE 114 attempts to detect. LC/CE UE 114 needs to know the number of repetitions for the MPDCCH transmission in order to determine a first SF for a transmission of a PDSCH conveying the RAR. The first SF is determined to be the one occurring 2 SFs after the SF of a last repetition for the MPDCCH transmission. When the first SF does not support MPDCCH transmission, the first next SF that supports MPDCCH transmission is used to transmit the first repetition of the MPDCCH transmission.
d) Narrowband index field: For a DL system BW with a total of N$_{NB}$ narrowbands (or narrowbands), the narrowband for the first repetition of a PDSCH transmission conveying a RAR is indicated by ceil(log 2(N$_{NB}$)) bits where ceil( ) is the ceiling function that rounds a number to its immediately larger integer. For example, for a DL system BW of 50 PRBs, there are N$_{NB}$=floor (50/6)=8 narrowbands and one of the 8 narrowbands can be indicated using 3 bits, where floor( ) is the floor function that rounds a number to its immediately smaller integer. The narrowbands for the MPDCCH transmission conveying the DCI format scheduling the PDSCH that conveys the RAR message are indicated by eNB 102 through a SIB for each CE level associated with a RA preamble transmission. An RB assignment within an indicated narrowband is not needed when the PDSCH conveying a RAR is transmitted over all 6 PRBs of the narrowband.
e) Modulation and Coding Scheme (MCS) field: This field provides the MCS for the PDSCH transmission conveying the RAR.
f) NDI field and HARQ process number field: The new data indicator (NDI) field and the HARQ process number field exist in a DCI format scheduling a unicast PDSCH transmission to LC/CE UE 114 but the respective bits are reserved in the DCI format scheduling a PDSCH transmission to LC/CE UE that conveys a RAR. Additional fields that are reserved can exist such as a field indicating a PUCCH resource offset for a transmission of HARQ-ACK information by LC/CE UE 114 in response to a unicast PDSCH transmission to LC/CE UE 114.
g) CRC/RA-RNTI: A DCI format scheduling a PDSCH transmission conveying a RAR is encoded with a 16-bit CRC that is scrambled (XOR operation) with a 16-bit RA-RNTI associated with the RAR.

A RAR message for a LC/CE UE 114 includes scheduling information (UL grant) for LC/CE UE 114 to convey an Msg3 in a respective PUSCH transmission. Contents for the UL grant are provided in Table 4 and can be different depending on a CE level associated with a respective RA preamble transmission. The UL grant associated with a large CE level (CE Mode B) for the respective RA preamble transmission requires one less octet (8 bits) than the UL grant associated with no/small CE (CE Mode A) for the respective RA preamble transmission. When ceil($\log_2(N_{NB})$) is smaller than 4 bits, additional bits can be padded to result a narrowband index field of 4 bits for CE Mode A.

TABLE 4

Contents of UL grant for Msg3 for no/small CE and for large CE

| RAR message field | Number of bits No/small CE (CE Mode A) | Number of bits Large CE (CE Mode B) | Comments |
|---|---|---|---|
| PUSCH Repetitions | 2 | 2 | Set of repetition numbers is indicated by a SIB per RA preamble CE level |
| Narrowband index | ceil($\log_2(N_{NB})$) | 2 | The narrowband index for Msg3 transmission is indicated by ceil($\log_2(N_{NB})$) bits |
| PRB assignment | 4 | 3 | PRBs with the narrowband used for transmitting a PUSCH conveying Msg3 |
| MCS | 3 | 3 | Only QPSK modulation for large CE |
| TPC command | 3 | 0 | Maximum Msg3 Tx power for large CE |
| UL delay | 1 | 0 | Subframe delay for PUSCH transmission |
| CSI-request | 1 | 0 | Indicates whether CSI report shall be included in Msg3 |
| CSS Narrowband | 2 | 2 | Narrowband for first repetition of an MPDCCH transmission scheduling Msg3/Msg4 |

The fields in the DCI format in Table 3 are:

a) PUSCH Repetitions field: Indicates a number of repetitions, from a predetermined set of numbers of repetitions, for a PUSCH transmission conveying the Msg3. The set of numbers of repetitions is signaled by eNB 102 through a SIB for each CE level associated with a CE level of the associated RA preamble transmission.

b) Narrowband index field: For an UL system BW with a total of $N_{NB}$ narrowbands, the narrowband of the PUSCH transmission conveying Msg3 is indicated by ceil($\log_2(N_{NB})$) bits for CE Mode A (padded to 4 bits when ceil($\log_2(N_{NB})$) is less than 4 bits) and by 2 bits for CE Mode B in order to allow for indication of narrowbands for MPDCCH transmission scheduling a Msg3 retransmission in a PUSCH or a Msg4 transmission in a PDSCH while maintaining a total size of 12 bits for the UL grant. A default configuration for the narrowbands for the MPDCCH transmission, provided by a '00' value, can be that the narrowbands for the MPDCCH transmission are same as the narrowbands for the MPDCCH transmission conveying the DCI format scheduling the PDSCH that conveys the RAR.

c) PRB assignment field: For a Msg3 transmission with no/small CE (CE Mode A), any consecutive PRBs from the 6 PRBs of the indicated narrowband can be used for Msg3 transmission and the consecutive PRBs can be signaled with ceil($6 \times 7/2$)=5 bits. For a Msg3 transmission with large CE (CE Mode B), LC/CE UE 114 is assumed to be power limited and only a single PRB from the 6 PRBs of the indicated narrowband can be used for Msg3 transmission and the single PRB can be enumerated with ceil($\log_2(6)$)=3 bits.

d) MCS field: This field provides the MCS for the PUSCH transmission conveying the Msg3. For large CE (CE Mode B), only QPSK modulation shall apply for Msg3 and the MCS can be indicated with 3 bits. When QAM16 modulation is precluded also for no/small CE, a 3-bit MCS field can also be used for no/small CE.

e) TPC command field: A TPC command indicates an adjustment transmission power of a PUSCH conveying Msg3. For large CE (CE Mode B), a transmission power is assumed to be a maximum one for LC/CE UE 114 and a TPC command field is not applicable.

f) UL delay field: The UL delay field indicates an additional delay in number of SFs that LC/CE UE 114 shall apply for a PUSCH transmission conveying Msg3. When the UL delay field has a value of '0' no delay applies. When the UL delay has a value of '1', LC/CE UE 114 applies an UL delay of a number of SFs equal to a number of repetitions indicated in the UL grant for a transmission of a PUSCH conveying the Msg3.

g) CSI-request field: The CSI request field indicates whether LC/CE UE 114 shall include (through a value of '1') or shall not include (through a value of '0') a CSI report in a PUSCH transmission conveying Msg3. CSI reports are not supported for a LC/CE UE 114 that transmitted a respective RA preamble in a large CE (CE Mode B).

h) CSS narrowband field: The narrowband for a first repetition of an MPDCCH transmission scheduling a PUSCH conveying an Msg3 retransmission or a PDSCH conveying an Msg4 transmission or the RRC-ConnectionSetup with eNB 102. A default value for the CSS narrowband, corresponding to a '00' for the CSS narrowband field, can be that the narrowband for a first repetition of an MPDCCH transmission is same as the narrowband of the first repetition for the MPDCCH transmission scheduling the PDSCH conveying the RAR. The remaining values can correspond to offsets relative to the narrowband of the first repetition for the MPDCCH transmission scheduling the PDSCH conveying the RAR. The RRCConnectionSetup can configure one or more narrowbands for MPDCCH transmissions scheduling unicast PDSCH transmissions or unicast PUSCH transmissions.

Figure 14:
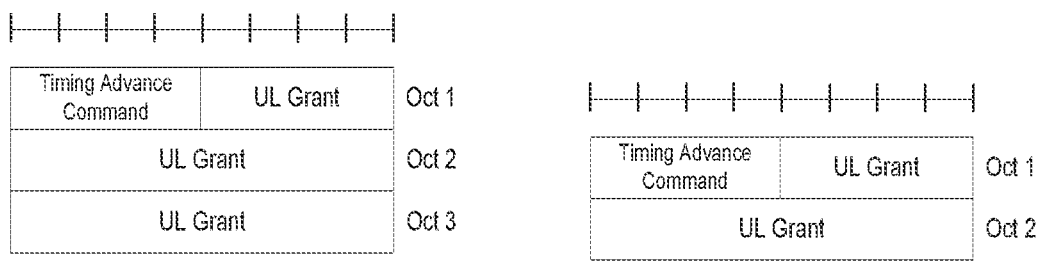
FIG. 14 illustrates contents of an UL grant ire a first RAR message corresponding to a first CE mode and in a second RAR message corresponding to a second CE mode according to this disclosure.

FIG. 14 illustrates contents of an UL grant in a first RAR message corresponding to a first CE mode and in a second RAR message corresponding to a second CE mode according to this disclosure.

For the first RAR message, the UL grant is transmitted in 3 octets of bit where 4 bits in an octet are part of a TA command and the remaining 20 bits provide the UL gram. For the second. RAR message, the UL grant is transmitted in 2 octets of bit where 4 bits in an octet are part of a TA command and the remaining 12 bits provide the UL grant.

Msg3 retransmissions, that are needed when eNB 102 incorrectly detects an initial Msg3 transmission, can be scheduled by an MPDCCH conveying a unicast DCI format (with CRC scrambled with a TC-RNTI that is provided in the RAR. However, considering that an MPDCCH transmission can require repetitions and use all ECCEs in a narrowband of 6 RBs, as in FIG. 12, this can result to an inability for eNB 102 to simultaneously transmit MPDCCH to schedule Msg3 retransmissions from multiple LC/CE UEs. In case of synchronous UL HARQ process, a consequence is that one or more Msg3 retransmissions cannot be supported.

The present disclosure provides several embodiments to remedy this operational disadvantage. In one example, ECCE aggregation levels smaller than 24 ECCEs, such as 8 ECCEs or 16 ECCEs, can be supported even for large CE for an MPDCCH transmission scheduling an Msg3 retransmission, thereby enabling simultaneous transmissions of more than one such MPDCCHs.

In another example, asynchronous HARQ can apply for PUSCH transmissions conveying an Msg3 retransmission.

In another example, PUSCH transmissions conveying an Msg3 retransmission can be non-adaptive and triggered by HARQ-ACK information (HACK) conveyed by a DCI format that can be detected by all LC/CE UEs having respective RAR messages. The DCI format can have a same size as a DCI format scheduling a PDSCH transmission conveying a respective RAR or a same size as a DCI format scheduling an Msg3 retransmission. The CRC of the DCI format can be scrambled with the RA-RNTI and the UL/DL flag in the DCI format can be set to indicate scheduling instead of PDSCH scheduling. In addition to the UL/DL flag bit, a number of bits equal to a number of LC/CE UEs addressed by the RAR provide HARQ-ACK information for respective Msg3 transmissions according to an order used to provide respective RAR messages in the PDSCH conveying the RAR messages. For example, a binary '0' can indicate a NACK and a binary '1' can indicate an ACK. The eNB 102 can transmit either an MPDCCH scheduling a unicast PUSCH transmission from LC/CE LIE 114 through a DCI format with CRC scrambled with a respective TC-RNTI, for example when only LC/CE UE 114 needs to provide an Msg3 retransmission, or transmit, a DCI format conveying HARQ-ACK information to multiple LC/CE UEs with respective RAR messages and respective Msg3 initial transmissions when the multiple LC/CE UEs need to provide respective Msg3 retransmissions. LC/CE LIE 114 can perform descrambling of the CRC of a decoded DCI format using a respective TC-RNTI or using a RA-RNTI to respectively determine whether the DCI format schedules an adaptive unicast PUSCH transmission or provides HARQ-ACK information for a previous Msg3 transmissions (and schedules one or more non-adaptive PUSCH transmissions for respective Msg3 retransmissions).

In another example, LC/CE UE 114 interprets an absence of detection for a DCI format scheduling an Msg3 retransmission as an ACK but continues to monitor MPDCCH that can convey a DCI format scheduling an Msg3 retransmission.

A various embodiments of the present disclosure provide HARQ-ACK information for PUSCH transmissions by MPDCCH.

Due to a reduced reception BW capability, LC/CE UE 114 cannot receive PHICH transmissions from eNB 102. The only other means available for eNB 102 to provide HARQ-ACK information to LC/CE UE 114 is by the NDI field that is included in a DCI format scheduling a PUSCH transmission (UL DCI format). For a same HARQ process, when the NDI bit is set to '0', LC/CE UE 114 transmits a same data TB with a next redundancy version (RV) in a PUSCH while when the NDI bit is set to '1', LC/CE UE 114 transmits a new data TB with RV=0 (see also REF 2 and REF 3). LC/CE UE 114 keeps a data TB for a HARQ process in the LC/CE UE 114 buffer until LC/CE UE 114 detects an UL DCI format with NDI set to '1' (for the same HARQ process). Therefore, the NDI field in an UL DCI format serves to provide implicit HARQ-ACK information for a data TB transmission in a PUSCH for a HARQ process.

One disadvantage of using a DCI format to provide HARQ-ACK information for a PUSCH transmission is a DL overhead associated with an MPDCCH transmission conveying the DCI format. One approach to reduce such overhead is for eNB 102 to occasionally not transmit MPDCCH in case of an ACK response to a previous PUSCH transmission by LC/CE UE 114. One problem with such an approach is that when LC/CE UE 114 fails to detect a transmitted MPDCCH (that implicitly conveys a NACK through the NDI field in the DCI format), LC/CE UE 114 does not transmit PUSCH. As eNB 102 cannot typically perform accurate detection for an absence of a PUSCH transmission, eNB 102 will accumulate noise leading to HARQ buffer corruption. Therefore, a NACK-to-ACK error occurs with probability of 1%, i.e. 10 times or 100 times larger than typically required. Subsequent retransmissions cannot resolve the HARQ buffer corruption because eNB 102 and LC/CE UE 114 have a different understanding of the RV (for example, LC/CE UE 114 assumes RV=2 for a first retransmission of a new data TB while eNB 102 can assumes RV=3 for a second retransmission of a previous data TB) and such errors can propagate in time. A different understanding between eNB 102 and LC/CE UE 114 can also exist for the MCS of the PUSCH transmission thereby making certain a HARQ buffer corruption. Different RV understanding or different MCS understanding between eNB 102 and LC/CE UE 114 can also occur when LC/CE UE 114 interprets an UL DCI format detection as a NACK for a data TB transmission for a HARQ process.

The different MCS understanding and the different RV understanding between eNB 102 and LC/CE UE 114 can be resolved by separating the joint "MCS and RV" field in an UL DCI format into an individual MCS field and an individual RV field. Such separation is required when HARQ process for PUSCH transmissions is asynchronous. When HARQ process for PUSCH transmissions is synchronous, LC/CE UE 114 can determine whether an UL DCI format schedules a second or third retransmission of a previous data TB when LC/CE UE 114 failed to detect an UL DCI format scheduling a first or second retransmission for the previous data TB, respectively, or the UL DCI format schedules a first retransmission of a new data TB when LC/CE UE 114 failed to detect an UL DCI format scheduling a first transmission for the new data TB. An MCS field can be represented by a number of bits required to address a number of supportable MCS values. An RV field can be represented by 2 bits to indicate one of the four possible RVs with '00' indicating RV0, '01' indicating RV2, '10' indicating RV3, and '11' indicating RV1.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with example embodiments, various changes and modifications can be suggested to one skilled in the art. It is intended that the present disclosure encompass such changes and modifications that fall within the scope of the appended claims.

What is claimed is:

1. A method comprising:
   determining locations of first control channel elements (CCEs) within a set of resource blocks (RBs) for transmission of a first physical downlink control channel (PDCCH) and locations of second CCEs within the set of RBs for transmission of a second PDCCH, wherein:
   when the set of RBs is a first set of RBs, the first CCEs and the second CCEs are within the first set of RBs,
   when the set of RBs is a second set of RBs, the first CCEs and the second CCEs are within the second set of RBs, and
   when the set of RBs is a third set of RBs:
      the first CCEs are only within the first set of RBs or only within the second set of RBs, and
      the second CCEs are within the first set of RBs and within the second set of RBs, wherein the third set of RBs is a union of the first set of RBs and the second set of RBs; and
   transmitting the first and second PDCCHs.

2. The method of claim 1, further comprising:
   transmitting first configuration information providing the first set of RBs and the second set of RBs; and
   transmitting second configuration information indicating candidate locations of CCEs for a PDCCH transmission within the first set of RBs and within the second set of RBs.

3. The method of claim 1, wherein a minimum number of CCEs for the second PDCCH transmission is smaller when the set of RBs is the first set of RBs or the second set of RBs than when the set of RBs is the third set of RBs.

4. The method of claim 1, wherein a maximum number of CCEs for the second PDCCH transmission is smaller when the set of RBs is the first set of RBs or the second set of RBs than when the set of RBs is the third set of RBs.

5. The method of claim 1, wherein:
   the set of RBs is the third set of RBs,
   the first and second sets of RBs do not have any common RB,
   the RBs of the first and second sets of RBs are contiguous in frequency,
   a CCE includes resource elements groups (REGs),
   a REG includes resource elements (REs) for multiplexing a demodulation reference signal (DM-RS), and
   the DM-RS in a first REG in the first set of RBs has same precoding as the DM-RS in a second REG in the second set of RBs.

6. The method of claim 1, wherein:
   the first set of RBs and the second set of RBs do not have any common RB,
   the first set of RBs includes two RBs,
   the second set of RBs includes four RBs, and
   the third set of RBs includes six RBs.

7. The method of claim 1, wherein a maximum number of candidate locations of CCEs is larger when the set of RBs is the first set or the second set than when the set of RBs is the third set.

8. A base station comprising:
   a processor configured to determine locations of first control channel elements (CCEs) within a set of resource blocks (RBs) for transmission of a first physical downlink control channel (PDCCH) and locations of second CCEs within the set of RBs for transmission of a second PDCCH, wherein:
   when the set of RBs is a first set of RBs, the first CCEs and the second CCEs are within the first set of RBs,
   when the set of RBs is a second set of RBs, the first CCEs and the second CCEs are within the second set of RBs, and
   when the set of RBs is a third set of RBs:
      the first CCEs are only within the first set of RBs or only within the second set of RBs, and
      the second CCEs are within the first set of RBs and within the second set of RBs, wherein the third set of RBs is a union of the first set of RBs and the second set of RBs; and
   a transceiver operably connected to the processor, the transceiver configured to transmit the first and second PDCCHs.

9. The base station of claim 8, wherein the transceiver is further configured to transmit:
   first configuration information providing the first set of RBs and the second set of RBs, and
   second configuration information indicating candidate locations of CCEs for a PDCCH transmission within the first set of RBs and within the second set of RBs.

10. The base station of claim 8, wherein a minimum number of CCEs for the second PDCCH transmission is smaller when the set of RBs is the first set of RBs or the second set of RBs than when the set of RBs is the third set of RBs.

11. The base station of claim 8, wherein a maximum number of CCEs for the second PDCCH transmission is smaller when the set of RBs is the first set of RBs or the second set of RBs than when the set of RBs is the third set of RBs.

12. The base station of claim 8, wherein:
   the set of RBs is the third set of RBs,
   the first and second sets of RBs do not have any common RB,
   the RBs of the first and second sets of RBs are contiguous in frequency,
   a CCE includes resource elements groups (REGs),
   a REG includes resource elements (REs) for multiplexing a demodulation reference signal (DM-RS), and
   the DM-RS in a first REG in the first set of RBs has same precoding as the DM-RS in a second REG in the second set of RBs.

13. The base station of claim 8, wherein:
   the first set of RBs and the second set of RBs do not have any common RB,
   the first set of RBs includes two RBs,
   the second set of RBs includes four RBs, and
   the third set of RBs includes six RBs.

14. The base station of claim 8, wherein a maximum number of candidate locations of CCEs is larger when the set of RBs is the first set or the second set than when the set of RBs is the third set.

15. A user equipment (UE) comprising:
a processor configured to determine locations of first control channel elements (CCEs) within a set of resource blocks (RBs) for transmission of a first physical downlink control channel (PDCCH) and locations of second CCEs within the set of RBs for transmission of a second PDCCH, wherein:
when the set of RBs is a first set of RBs, the first CCEs and the second CCEs are within the first set of RBs,
when the set of RBs is a second set of RBs, the first CCEs and the second CCEs are within the second set of RBs, and
when the set of RBs is a third set of RBs:
the first CCEs are only within the first set of RBs or only within the second set of RBs, and
the second CCEs are within the first set of RBs and within the second set of RBs, wherein the third set of RBs is a union of the first set of RBs and the second set of RBs; and
a transceiver operably connected to the processor, the transceiver configured to receive the first and second PDCCHs.

16. The UE of claim 15, wherein the transceiver is further configured to receive:
first configuration information providing the first set of RBs and the second set of RBs, and
second configuration information indicating candidate locations of CCEs for a PDCCH reception within the first set of RBs and within the second set of RBs.

17. The UE of claim 15, wherein a minimum number of CCEs for the second PDCCH reception is smaller when the set of RBs is the first set of RBs or the second set of RBs than when the set of RBs is the third set of RBs.

18. The UE of claim 15, wherein a maximum number of CCEs for the second PDCCH reception is smaller when the set of RBs is the first set of RBs or the second set of RBs than when the set of RBs is the third set of RBs.

19. The UE of claim 15, wherein:
the set of RBs is the third set of RBs,
the first and second sets of RBs do not have any common RB,
the RBs of the first and second sets of RBs are contiguous in frequency,
a CCE includes resource elements groups (REGs),
a REG includes resource elements (REs) for multiplexing a demodulation reference signal (DM-RS), and
the DM-RS in a first REG in the first set of RBs has same precoding as the DM-RS in a second REG in the second set of RBs.

20. The UE of claim 15, wherein:
the first set of RBs and the second set of RBs do not have any common RB,
the first set of RBs includes two RBs,
the second set of RBs includes four RBs, and
the third set of RBs includes six RBs.

* * * * *